United States Patent [19]

Yasuda et al.

[11] Patent Number: 5,920,649
[45] Date of Patent: Jul. 6, 1999

[54] BRAILLE RECOGNITION SYSTEM WITH TERNARY-CODING

[75] Inventors: Naotaka Yasuda, Kawachinagano; Mitsunobu Enomoto, Nara, both of Japan

[73] Assignee: Sanyo Electric Co., Ltd., Osaka, Japan

[21] Appl. No.: 08/898,557

[22] Filed: Jul. 22, 1997

[30] Foreign Application Priority Data

Jul. 30, 1996 [JP] Japan ..................................... 8-200070
Jul. 30, 1996 [JP] Japan ..................................... 8-200071

[51] Int. Cl.$^6$ .............................. G06K 9/52; G06K 9/00; G06K 9/18; G06K 9/36
[52] U.S. Cl. .......................... 382/206; 382/114; 382/182; 382/190; 382/203; 382/205; 382/232; 341/57; 434/114; 340/825.19; 400/109.1
[58] Field of Search ..................................... 382/100, 108, 382/114, 182, 190, 195, 200, 201, 203, 204, 205, 206, 211, 218, 281, 232; 341/57; 434/113, 114; 340/825.19, 281.1; 400/109.1

[56] References Cited

U.S. PATENT DOCUMENTS

| | | |
|---|---|---|
| 4,990,093 | 2/1991 | Frazer et al. .............................. 382/314 |
| 4,991,092 | 2/1991 | Greensite .................................. 382/279 |
| 5,259,041 | 11/1993 | Kato et al. ............................... 382/282 |
| 5,306,152 | 4/1994 | Shimoda .................................. 434/114 |
| 5,594,809 | 1/1997 | Kopec et al. ............................ 382/228 |
| 5,636,292 | 6/1997 | Rhoads .................................... 382/232 |
| 5,754,312 | 5/1998 | Fujimoto et al. ........................ 382/224 |

*Primary Examiner*—Bipin Shalwala
*Attorney, Agent, or Firm*—Nikaido, Marmelstein, Murray & Oram LLP

[57] ABSTRACT

Light is obliquely irradiated onto the surface of a document in braille, and its reflected light is received, to obtain a first gray image. The first gray image is subjected, while being scanned in a direction corresponding to a direction parallel to the direction of light irradiation, to differentiation processing in the scanning direction, to produce a second gray image whose light and dark portions respectively produced by projected points have a particular pattern. The second gray image is subjected to such ternary-coding processing that the particular pattern of the light and dark portions respectively produced by the projected points in the second gray image is emphasized, to produce a ternary-coded image. Each of the projected points is extracted by pattern matching with respect to the ternary-coded image.

8 Claims, 29 Drawing Sheets

FIG. 7

| 1 | 1 | 1 |
|---|---|---|
| 1 | 0 | 1 |
| 1 | 1 | 1 |

FIG. 8

| A | B | C |
|---|---|---|
| D | E | F |
| G | H | I |

FIG. 9

| 0 | −1 | 0 |
|---|----|---|
| 0 | 1  | 0 |
| 0 | 0  | 0 |

FIG. 12

| 1 | 0 | −1 |
|---|---|---|
| 2 | 0 | −2 |
| 1 | 0 | −1 |

WHITE PEAK POINT

BLACK PEAK POINT

FIG. 16

| -1 | 0 | 1 |
|----|---|---|
| -2 | 0 | 2 |
| -1 | 0 | 1 |

WHITE PEAK POINT

BLACK PEAK POINT

WHITE PEAK POINT      DON'T CARE

BLACK PEAK POINT      BLACK PEAK POINT (TARGET PIXEL)

TARGET PIXEL

PIXEL TO BE MASKED

FIRST ROW OF BRAILLE

FIRST ROW OF BRAILLE

BRAILLE RECOGNITION SYSTEM WITH TERNARY-CODING

BACKGROUND OF THE INVENTION

1. Field of the Invention

The present invention relates to a braille recognition system.

1. Description of the Prior Art

Currently in six-point braille generally employed, six points comprising three columns of points and two rows of points are taken as one braille unit, as shown in FIG. 34, and characters are constructed by a combination of the projected points. This braille unit is referred to as a "masu".

In each masu, the projected point in the uppermost stage of the left column, the projected point in the intermediate stage of the left column, the projected point in the lowermost stage of the left column, the projected point in the uppermost stage of the right column, the projected point in the intermediate stage of the right column, and the projected point in the lowermost stage of the right column are respectively referred to as point $\hat{1}$, point $\hat{2}$, point $\hat{3}$, point $\hat{4}$, point $\hat{5}$, and point $\hat{6}$.

The spacing W1 between the projected points which are adjacent to each other in the lateral direction in the same masu is generally set to 2.0 to 2.1 mm. Further, the spacing W2 between the projected points which are adjacent to each other in the lateral direction between the adjacent masus is generally set to 3.0 to 3.1 mm.

The braille is horizontal writing, which is read from the left to the right. In the six-point braille, 63 types of different combinations are possible. However, it is impossible to represent all of kana characters, numeric characters and alphabetic characters by 63 types of combinations. When a numeric character or an alphabetic character is represented, therefore, a code referred to as a pre-code for identifying a character system is assigned ahead of the numeric character or the alphabetic character.

A character on printed matter is referred to as a character in India ink, in contrast with braille. As a code corresponding to the braille, NABCC (North American Braille Computer Code) is generally used.

SUMMARY OF THE INVENTION

An object of the present invention is to provide a braille recognition system capable of recognizing braille on the basis of a picked-up image of a document in braille.

Another object of the present invention is to provide a braille recognition system capable of recognizing, on the basis of a picked-up image corresponding to one surface of a document in braille having braille printed on both its surfaces, the braille on both the surfaces of the document in braille.

Still another object of the present invention is to provide a braille recognition system capable of accurately correcting the slope of a projected point extracting image or a recessed point extracting image and improving the recognition precision of braille.

A first braille recognition system according to the present invention is characterized by comprising imaging means for obliquely irradiating light onto the surface of a document in braille and receiving its reflected light, to obtain a first gray image, and projected point extracting means for extracting each of projected points on the surface of the document in braille on the basis of the first gray image, the projected point extracting means comprising differentiating means for subjecting, while scanning the first gray image in a direction corresponding to a direction parallel to the direction of light irradiation, the first gray image to differentiation processing in the scanning direction, to produce a second gray image whose light and dart portions respectively produced by the projected points have a particular pattern, ternary-coding processing means for subjecting the second gray image to such ternary-coding processing that the particular pattern of the light and dark portions respectively produced by the projected points in the second gray image is emphasized, to produce a ternary-coded image, and pattern matching processing means for extracting each of the projected points by pattern matching with respect to the ternary-coded image.

It is preferable to provide braille code producing means for recognizing the projected points constituting each braille unit on the surface of the document in braille on the basis of the results of the extraction of the projected points by the projected point extracting means and producing a braille code corresponding to the results of the recognition.

Examples of the differentiating means include one for subjecting the first gray image to differentiation processing using a Sobel differential operator.

A second braille recognition system according to the present invention is characterized by comprising imaging means for obliquely irradiating light onto one surface of a document in braille having braille printed on both its surfaces and receiving the reflected light, to obtain a first gray image, projected point extracting means for extracting projected points on the surface, onto which the light is irradiated, out of both surfaces of the document in braille on the basis of the first gray image, and recessed point extracting means for extracting recessed points on the surface, onto which the light is irradiated, out of both the surfaces of the document in braille on the basis of the first gray image, the projected point extracting means comprising first differentiating means for subjecting, while scanning the first gray image in a direction corresponding to a direction parallel to the direction of light irradiation, the first gray image to first differentiation processing in the scanning direction, to produce a second gray image whose light and dark portions respectively produced by the projected points have a particular pattern, first ternary-coding processing means for subjecting the second gray image to such ternary-coding processing that the particular pattern of the light and dark portions respectively produced by the projected points in the second gray image is emphasized, to produce a ternary-coded image, and first pattern matching processing means for extracting each of the projected points by pattern matching with respect to the first ternary-coded image, the recessed point extracting means comprising second differentiating means for subjecting, while scanning the first gray image in a direction corresponding to a direction parallel to the direction of light irradiation, the first gray image to second differentiation processing in the scanning direction, to produce a third gray image whose light and dark portions respectively produced by the recessed points have a particular pattern, second ternary-coding processing means for subjecting the third gray image to such ternary-coding processing that the particular pattern of the light and dark portions respectively produced by the recessed points in the third gray image is emphasized, to produce a second ternary-coded image, and second pattern matching processing means for extracting each of the recessed points by pattern matching with respect to the second ternary-coded image.

It is preferable to provide first braille code producing means for recognizing the projected points constituting each braille unit on the surface of the document in braille on the basis of the results of the extraction of the projected points by the projected point extracting means and producing a braille code corresponding to the results of the recognition, and second braille code producing means for recognizing recessed points constituting each braille unit on the reverse surface of the document in braille on the basis of the results of the extraction of the recessed points by the recessed point extracting means and producing a braille code corresponding to the results of the recognition.

Examples of the first differentiating means include one for subjecting the first gray image to differentiation processing using a first Sobel differential operator, and examples of the second differentiating means include one for subjecting the first gray image to differentiation processing using a second Sobel differential operator having weighting factors which are opposite in sign to those of the first Sobel differential operator.

A third braille recognition system according to the present invention is characterized by comprising imaging means for obliquely irradiating light onto the surface of a document in braille and receiving its reflected light, to obtain a gray image, and projected point extracting image producing means for producing a first projected point extracting image for extracting projected points on the surface of the document in braille on the basis of the gray image and storing the first projected point extracting image in an image memory, slope correcting means for correcting the slope of the first projected point extracting image and producing a second projected point extracting image, and braille code producing means for recognizing the projected points constituting each braille unit on the surface of the document in braille on the basis of the second projected point extracting image and producing a braille code corresponding to the results of the recognition, the slope correcting means comprising means for subjecting the first projected point extracting image to Hough transform, to respectively find the distances of straight lines respectively passing through the projected points and having a plurality of predetermined angles to a predetermined reference direction of the image memory from a predetermined origin position of the image memory, means for finding for each of the angles a distribution of frequencies each representing the number of straight lines corresponding to each of the found distances of the straight lines from the origin position, means for calculating for each of the angles the sum of the frequencies which are not more than a predetermined value, means for specifying the angle corresponding to the maximum one of the sums of the frequencies respectively calculated for the angles as an angle of inclination of the first projected point extracting image, and means for correcting the slope of the first projected point extracting image on the basis of the specified slope.

When the projected point extracting image is so stored in the image memory that a row of projected points parallel to a row of braille in the projected point extracting image is approximately parallel to an X direction of an XY coordinate system of the image memory, the predetermined reference direction of the image memory is an X direction of the image memory.

Examples of the projected point extracting image producing means include one comprising differentiating means for subjecting, while scanning the gray image in a direction corresponding to a direction parallel to the direction of light irradiation, the gray image to differentiation processing in the scanning direction, to produce a gray image whose light and dark portions respectively produced by the projected points have a particular pattern, ternary-coding processing means for subjecting the gray image obtained by the differentiating means to such ternary-coding processing that the particular pattern of the light and dark portions respectively produced by the projected points in the gray image is emphasized, to produce a ternary-coded image, and pattern matching processing means for extracting each of the projected points by pattern matching with respect to the ternary-coded image. Examples of the differentiating means include one for subjecting the gray image to differentiation processing using a Sobel differential operator.

A fourth braille recognition system according to the present invention is characterized by comprising imaging means for obliquely irradiating light onto the surface of a document in braille and receiving its reflected light, to obtain a gray image, recessed point extracting image producing means for producing a first recessed point extracting image for extracting recessed points on the surface of the document in braille on the basis of the gray image and storing the first recessed point extracting image in an image memory, slope correcting means for correcting the slope of the first recessed point extracting image and producing a second recessed point extracting image, and braille code producing means for recognizing the recessed points constituting each braille unit on the surface of the document in braille on the basis of the second recessed point extracting image and producing a braille code corresponding to the results of the recognition, the slope correcting means comprising means for subjecting the first recessed point extracting image to Hough transform, to respectively find the distances of straight lines respectively passing through the recessed points and having a plurality of predetermined angles to a predetermined reference direction of the image memory from a predetermined origin position of the image memory, means for finding for each of the angles a distribution of frequencies each representing the number of straight lines corresponding to each of the found distances of the straight lines from the origin position, means for calculating for each of the angles the sum of the frequencies which are not more than a predetermined value, means for specifying the angle corresponding to the maximum one of the sums of the frequencies respectively calculated for the angles as an angle of inclination of the first recessed point extracting image, and means for correcting the slope of the first recessed point extracting image on the basis of the specified slope.

When the recessed point extracting image is so stored in the image memory that a row of recessed points parallel to a row of braille in the recessed point extracting image is approximately parallel to an X direction of an XY coordinate system of the image memory, the predetermined reference direction of the image memory is an X direction of the image memory.

Examples of the recessed point extracting image producing means include one comprising differentiating means for subjecting, while scanning the gray image in a direction corresponding to a direction parallel to the direction of light irradiation, the gray image to differentiation processing in the scanning direction, to produce a gray image whose light and dark portions respectively produced by the recessed points have a particular pattern, ternary-coding processing means for subjecting the gray image obtained by the differentiating means to such ternary-coding processing that the particular pattern of the light and dark portions respectively produced by the recessed points in the gray image is emphasized, to produce a ternary-coded image, and pattern matching processing means for extracting each of the recessed points by pattern matching with respect to the ternary-coded image. Examples of the differentiating means include one for subjecting the gray image to differentiation processing using a Sobel differential operator.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a typical diagram showing one example of an integral filter used in the luminance nonuniformity correction processing;

FIG. 8 is a typical diagram showing luminance values of pixels in a 3×3 matrix centered around a target pixel;

FIG. 9 is a typical diagram showing one example of an integral filter used for sharpening processing;

FIG. 12 is a typical diagram showing a Sobel operation for emphasizing edges of projected points;

FIG. 16 is a typical diagram showing a Sobel operation for emphasizing edges of recessed points;

FIG. 29 is a typical diagram showing spacing between columns in which projected points exist in a row of braille currently paid attention to;

DETAILED DESCRIPTION OF THE PREFERRED EMBODIMENTS

Referring now to FIGS. 1 to 33, embodiments of the present invention will be described.

[1] Description of Entire Construction of Braille Recognition System

Figure 1:
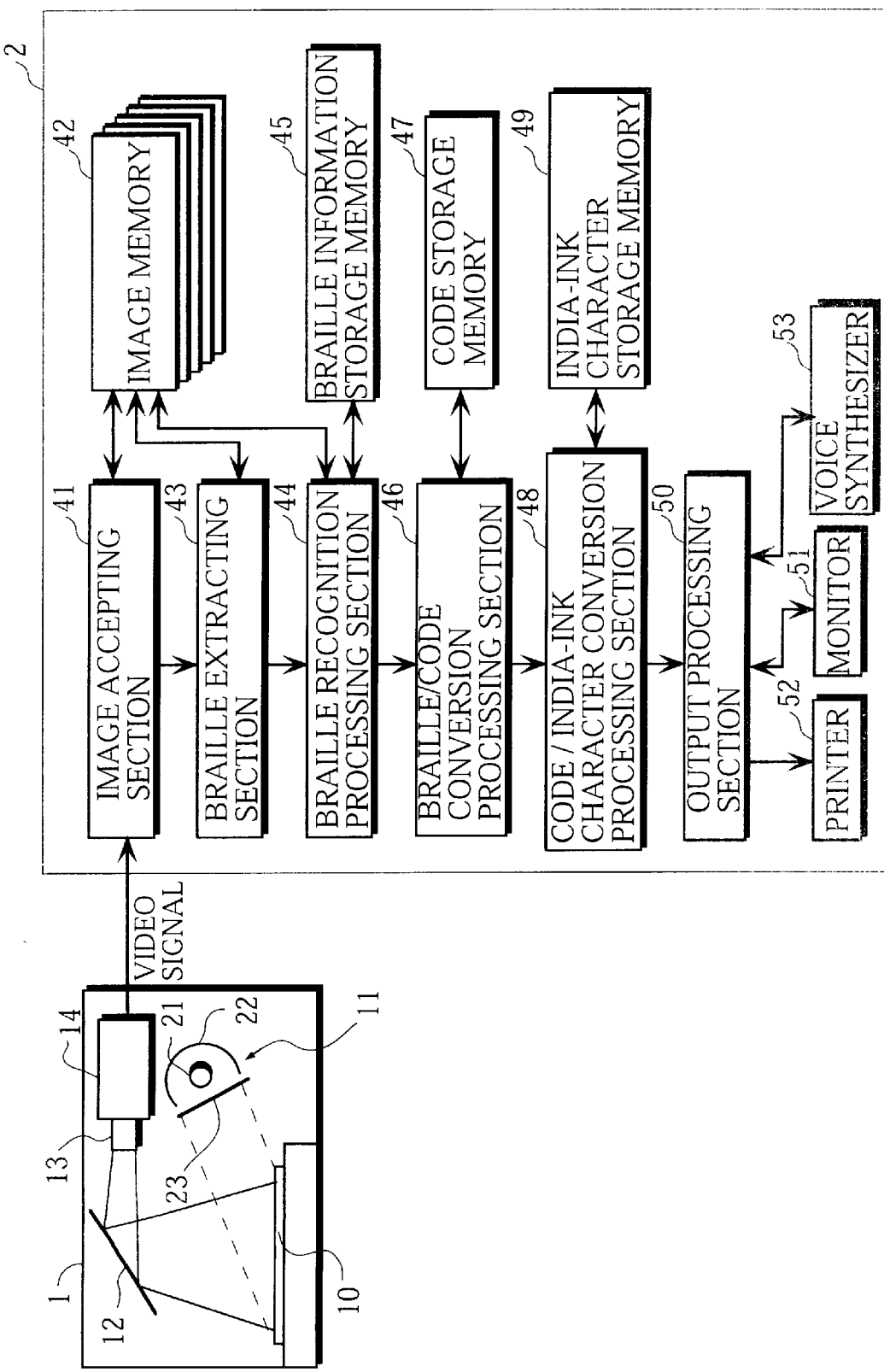
FIG. 1 is a block diagram showing the entire construction of a braille recognition system.

FIG. 1 illustrates the entire construction of a braille recognition system.

Examples of a document having braille printed thereon (hereinafter referred to as a document in braille) include a document having braille printed only on its surface (hereinafter referred to as a document in one-sided braille) and a document having braille printed on both its surfaces (hereinafter referred to as a document in both-sided braille).

In the document in one-sided braille, projected points constituting braille appear on the surface. In the document in both-sided braille, projected points constituting braille appear on the surface, and projected points constituting braille appear on the reverse surface. On the surface of the document in both-sided braille, therefore, the projected points constituting the braille on the surface appear, and the projected points constituting the braille on the reverse surface appear as recessed points.

The braille recognition system has a function of recognizing braille on the surface and braille on the reverse surface of a document in both-sided braille without turning the document in both-sided braille over in addition to a function of recognizing braille on a document in one-sided braille.

Description is now made of the construction of the braille recognition system on the basis of FIG. 1. The braille recognition system comprises a braille reading section 1 and a braille recognizing section 2.

The braille reading section 1 comprises a light irradiating section 11 for irradiating light onto a document in braille 10 obliquely from above, and a CCD camera 14 receiving light reflected from the document in braille 10 through a mirror 12 and a lens 13. When the document in braille is a document in one-sided braille, the document in braille is so set that the surface having braille printed thereon is directed upward.

The light irradiating section 11 comprises a light source 21 such as a fluorescent lamp, a reflecting plate 22, and a luminance nonuniformity correcting filter 23. Light emitted toward the luminance nonuniformity correcting filter 23 from the light source 21 and light emitted from the light source 21 and reflected from the reflecting plate 22 are obliquely irradiated onto the surface of the document in braille 10 through the luminance nonuniformity correcting filter 23.

Light is thus irradiated onto the document in braille 10 obliquely from above in order to judge the presence or absence of a projected point constituting braille (a projected point and a recessed point in the case of the document in both-sided braille) depending on a shadow formed by the projected point (the projected point and the recessed point in the case of the document in both-sided braille).

Figure 2:
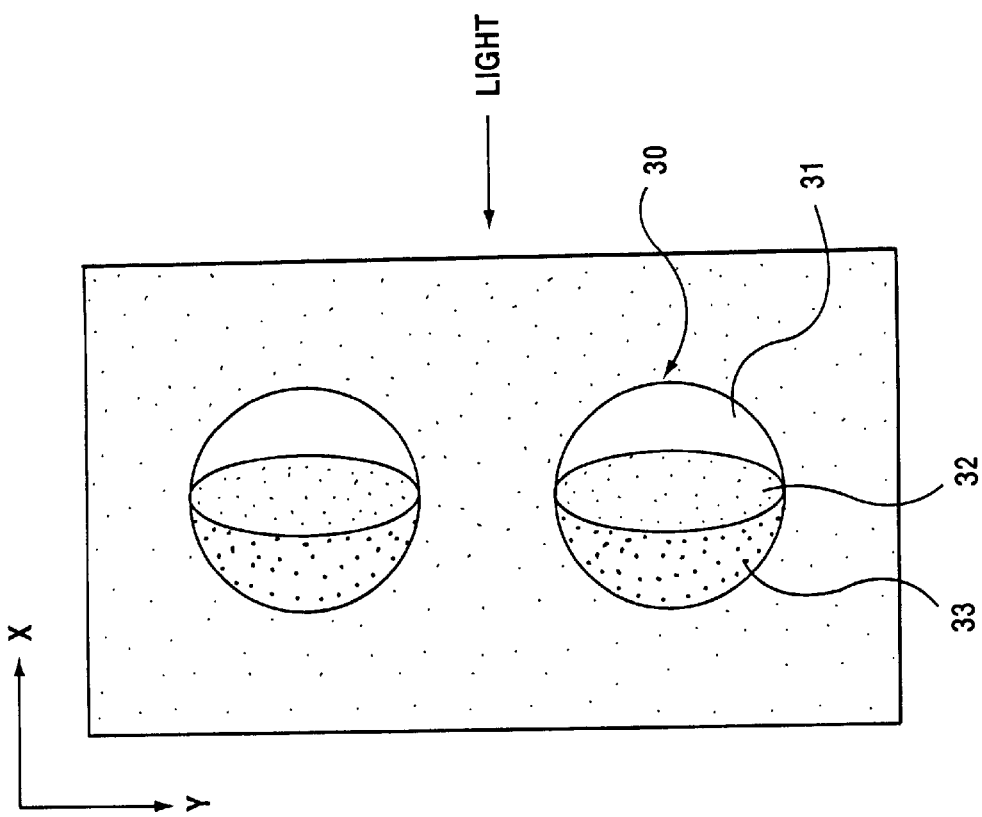
FIG. 2 is a typical diagram showing an image representing projected points imaged by a CCD camera and their periphery.

FIG. 2 illustrates a gray image corresponding to projected points imaged by the CCD camera 14 (braille printed on the surface of the document in braille) and their periphery.

A projected point 30 constituting braille is a hemispherical projection, whereby a shadow is formed in a portion 33 opposite to a portion 31 on which light is incident of the projected point 30. Consequently, the portion 31 on which light is incident of the projected point 30 becomes a color close to white which is higher in luminance than a background, the portion 33 opposite to the portion 31 on which light is incident becomes a color close to black which is lower in luminance than the background, and an intermediate portion 32 becomes gray which is approximately the same as the background in luminance.

Figure 3:
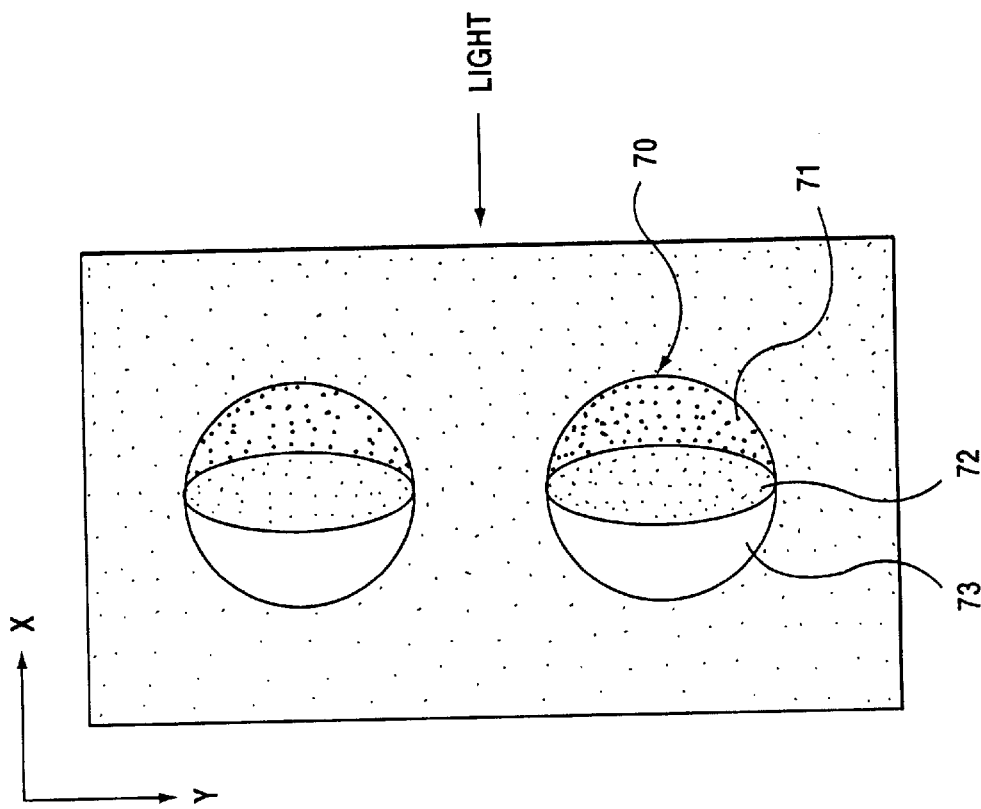
FIG. 3 is a typical diagram showing an image representing recessed points imaged by a CCD camera and their periphery.

FIG. 3 illustrates a gray image corresponding to recessed points imaged by the CCD camera 14 (projected points constituting braille printed on the reverse surface of the document in braille which appear on the surface) and their periphery.

The braille on the reverse surface of the document in braille appears as recessed points on the surface. Since a recessed point 70 is a hemispherical recess, a shadow is formed in a portion 71 on which light is incident of the recessed point 70. A portion 73 opposite to the portion 71 on which light is incident of the recessed point 70 becomes a color close to white which is higher in luminance than a background, the portion 71 on which light is incident becomes a color close to black which is lower in luminance than the background, and an intermediate portion 72 becomes gray which is approximately the same as the background in luminance.

Description is now made of operations performed by the braille recognizing section 2 in a case where one surface of the document in both-sided braille is imaged by the CCD camera 14.

A video signal outputted from the CCD camera 14 is converted into a digital signal (pixel data) in an image accepting section 41, after which the digital signal is stored in an image memory 42. A plurality of image memories 42 are provided.

In this example, the digital signal obtained by the image accepting section 41 shall be a signal representing the luminance value of a gray image by 8 bits. The portion 31 on which light is incident of the projected point 30 (or the portion 73 opposite to the portion 71 on which light is incident of the recessed point 70) takes a value close to a value "255" representing white, the portion 33 opposite to the portion 31 on which light is incident of the projected point 30 (or the portion 71 on which light is incident of the recessed point 70) takes a value close to a value "0" representing black, and the intermediate portion 32 (or 72) and the background take values slightly smaller than the value of the portion 31 on which light is incident of the projected point 30 (or the portion 73 opposite to the portion 71 on which light is incident of the recessed point 70). In this example, the size of one projected point 30 or one recessed point 70 is one corresponding to approximately 3×3 pixels.

A binary-coded image representing projected points corresponding to the braille on the surface of the document in braille and a binary-coded image representing recessed points corresponding to the braille on the reverse surface of the document in braille are then extracted by a braille extracting section 43 on the basis of image data (hereinafter referred to as an accepted image) stored in the image memory 42.

Data representing a pattern of projected points (recessed points) for each masu is produced from the binary-coded image representing projected points which are extracted by the braille extracting section 43 by a braille recognition processing section 44, and a reference position of each masu and data representing a pattern of projected points (recessed points) of the masu are stored in a braille information storage memory 45.

The data representing a pattern of projected points for each masu and the data representing a pattern of recessed points for each masu which are stored in the braille information storage memory 45 are respectively converted into braille codes by a braille/code conversion processing section 46. The braille code corresponding to the braille on the surface of the obtained document in braille and the braille code corresponding to the braille on the reverse surface of the document in braille are stored in a code storage memory 47.

The braille code corresponding to the braille on the surface of the document in braille and the braille code corresponding to the braille on the reverse surface of the document in braille which are stored in the code storage memory 47 are then respectively converted into data representing characters in India ink by a code/India-ink character conversion processing section 48. The data representing a character in India ink corresponding to the braille on the surface of the obtained document in braille and the data representing a character in India-ink corresponding to the braille on the reverse surface of the document in braille are stored in an India-ink character storage memory 49.

The data representing a character in India ink corresponding to the braille on the surface of the document in braille and the data representing a character in India ink corresponding to the braille on the reverse surface of the document in braille are displayed on a monitor 51 through an output processing section 50. Further, the data representing a character in India ink are printed by a printer 52 and are voice-outputted by a voice synthesizer 53.

The braille extracting section 43, the braille recognition processing section 44, and the braille/code conversion processing section 46 will be specifically described. In the following description, a direction parallel to the upper side of the document in braille is referred to as a row direction (a direction approximately parallel to an X direction of an XY coordinate system of the image memory 42), a direction parallel to the left side of the document in braille is referred to as a column direction (a direction approximately parallel to a Y direction of the XY coordinate system of the image memory 42). The light irradiating section 11 shall irradiate light onto the surface of the document in braille from the right side of the document in braille.

[2] Description of Operations by Braille Extracting Section 43.

Figure 4:
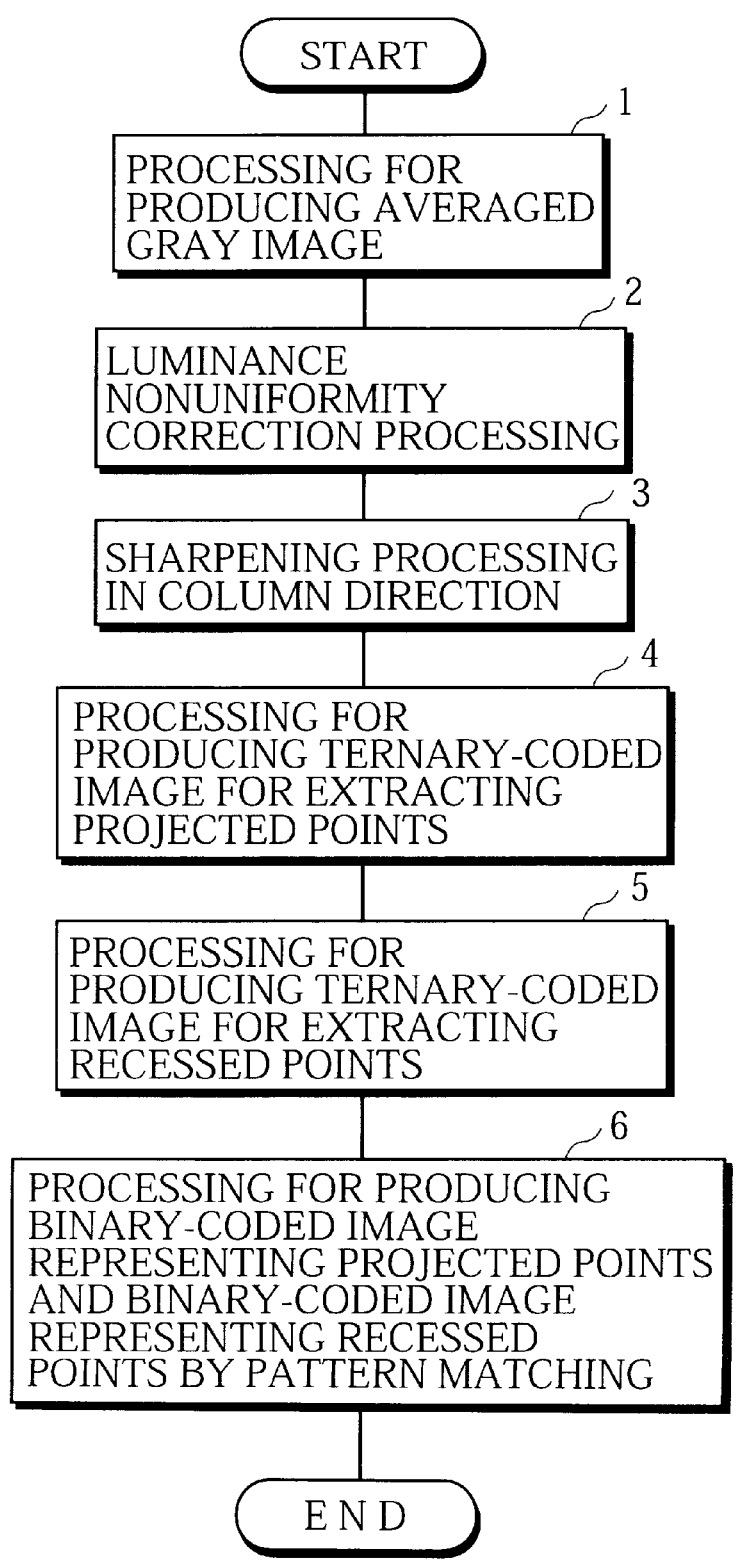
FIG. 4 is a flow chart showing the procedure for braille extraction processing by a braille extracting section.

FIG. 4 shows the procedure for processing performed by the braille extracting section 43.

An image is accepted by the image accepting section 41 in the same document in braille a plurality of number of times, for example, eight times, and respective accepted images are stored in the image memory 42.

(1) In the braille extracting section 43, a plurality of gray images accepted are first averaged, so that one gray image is produced (step 1).

Figure 5:
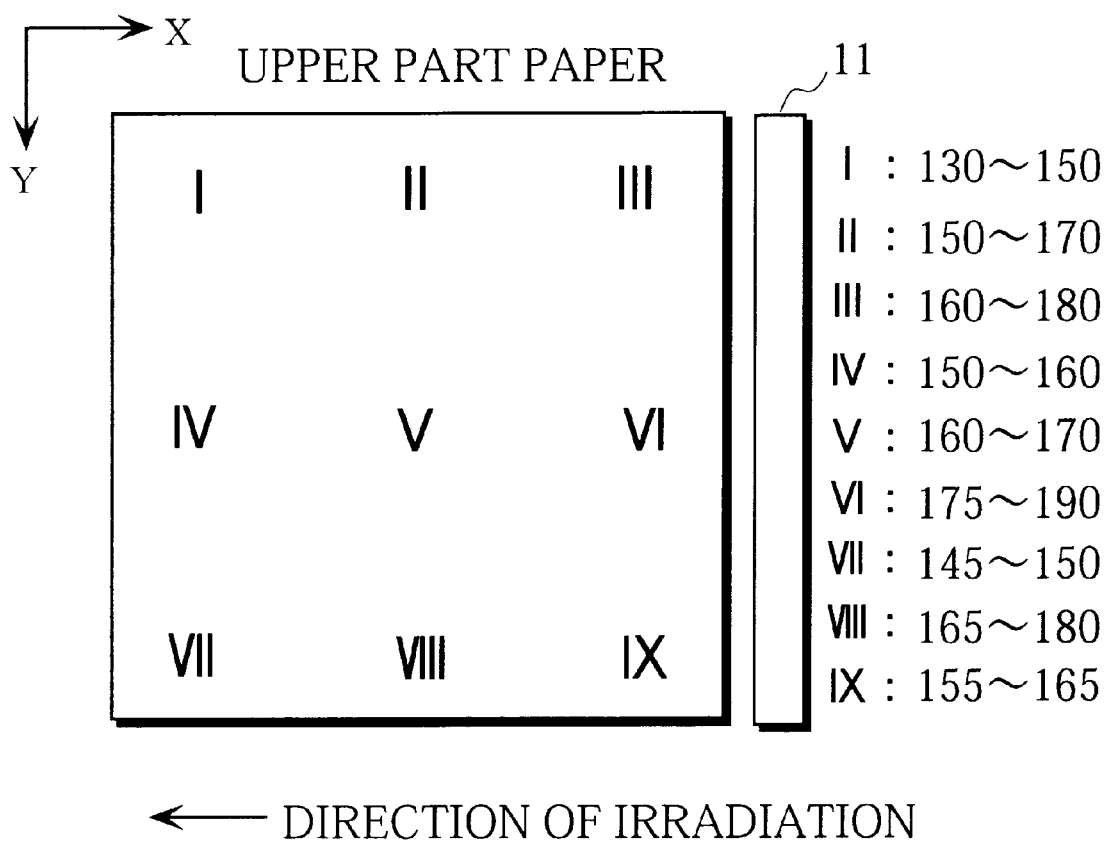
FIG. 5 is an explanatory view for explaining that a luminance value varies in each of positions of a document in braille.

(2) As shown in FIG. 1, light is obliquely irradiated onto the surface of the document in braille. Even if the luminance nonuniformity correcting filter 23 is provided, therefore, the luminance may be easily nonuniform depending on the position of the document in braille. FIG. 5 illustrates respective positions I to IX of paper having no braille printed thereon in a case where the paper is set in the braille reading section 1 and is imaged by the CCD camera 14 and luminance values in the respective positions I to IX. As can be seen from FIG. 5, the farther the position is away from the center of the light irradiating section 11 on the surface of the paper, the lower the luminance value therein is.

Therefore, luminance nonuniformity correction processing for removing the nonuniformity in luminance from the gray image obtained in the step 1 is performed (step 2). The luminance nonuniformity correction processing means that the luminance level of a portion where no braille exists (a background) is smoothed on the document in braille.

Figure 6A:
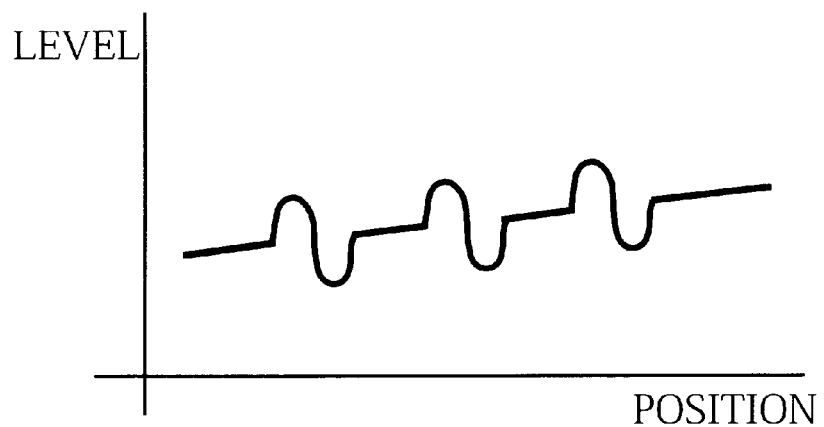
FIGS. 6a, 6b and 6c are explanatory views for explaining luminance nonuniformity correction processing.
Figure 6B:
Figure 6C:
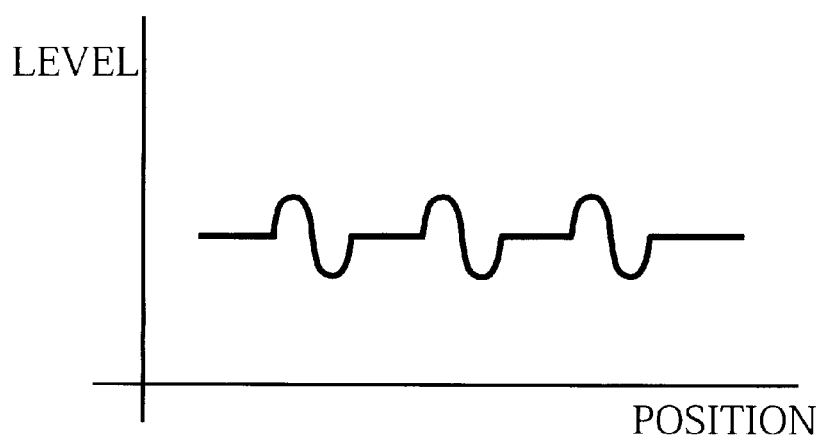

Referring to FIGS. 6a, 6b and 6c, description is made of the luminance nonuniformity correction processing. FIG. 6a illustrates a luminance level corresponding to the position in an X direction of a gray image.

Figures 7, 8:
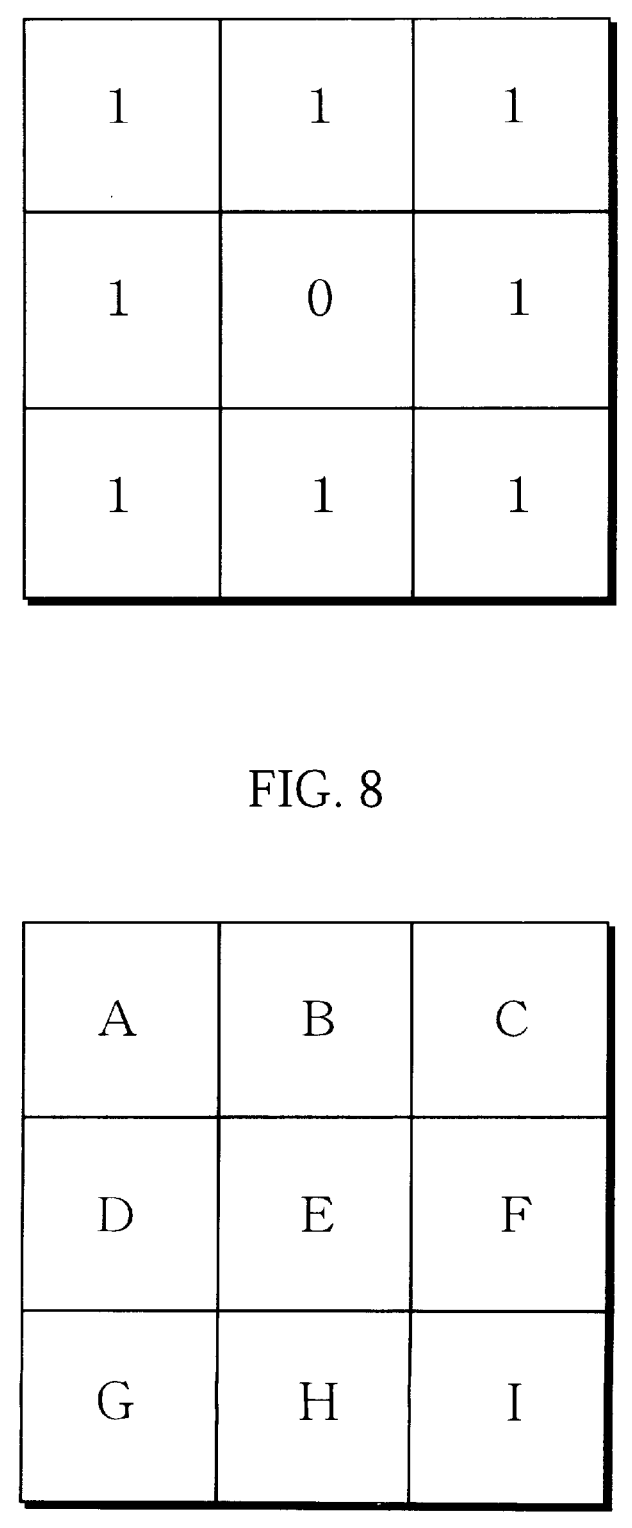

In the luminance nonuniformity correction processing, filtering processing (local integration) for replacing "light and dark portions respectively produced by projected points and recessed points of braille" with the luminance value of a background is performed a plurality of number of times, for example, seven times with respect to the gray image obtained in the step 1. In the filtering processing, a 3×3 integral filter as shown in FIG. 7, for example, is used. That is, letting A to I be luminance data representing respective pixels in a 3×3 matrix centered around a target pixel, as shown in FIG. 8, luminance data representing the target pixel E is converted into luminance data E expressed by the following equation (1):

$$E=(A+B+C+D+F+G+H+I)/8 \qquad (1)$$

As a result, as shown in FIG. 6b, luminance data whose background has a luminance value obtained by replacing "light and dark portions respectively produced by projected points and recessed points of braille" is produced.

The difference between the gray image before the filtering processing shown in FIG. 6a and the gray image after the filtering processing shown in 6b is calculated, whereby information "light and dark portions respectively produced by projected points and recessed points of braille" is not lost, and image data whose background has a uniform luminance value is obtained. Image data whose nonuniformity in luminance is corrected is stored in the image memory 42.

(3) The diameter, the height (the depth) and the like of each of the projected portions (or the recessed portions) appearing on the surface of the document in braille are not uniform, and the shape of each of the projected portions (or the recessed portions) is not also uniform because the projected point is crushed or broken, for example. Therefore, light and dark portions are also respectively produced by the projected portions (or the recessed portions) in a column direction of the document in braille. Therefore, the projected point and the projected point, the recessed point and the recessed point, or the projected point and the recessed point which are adjacent to each other in a column direction may, in some cases, be coupled to each other. Therefore, sharpening processing in a Y direction is performed with respect to image data whose nonuniformity in luminance is corrected (step 3).

Figure 9:
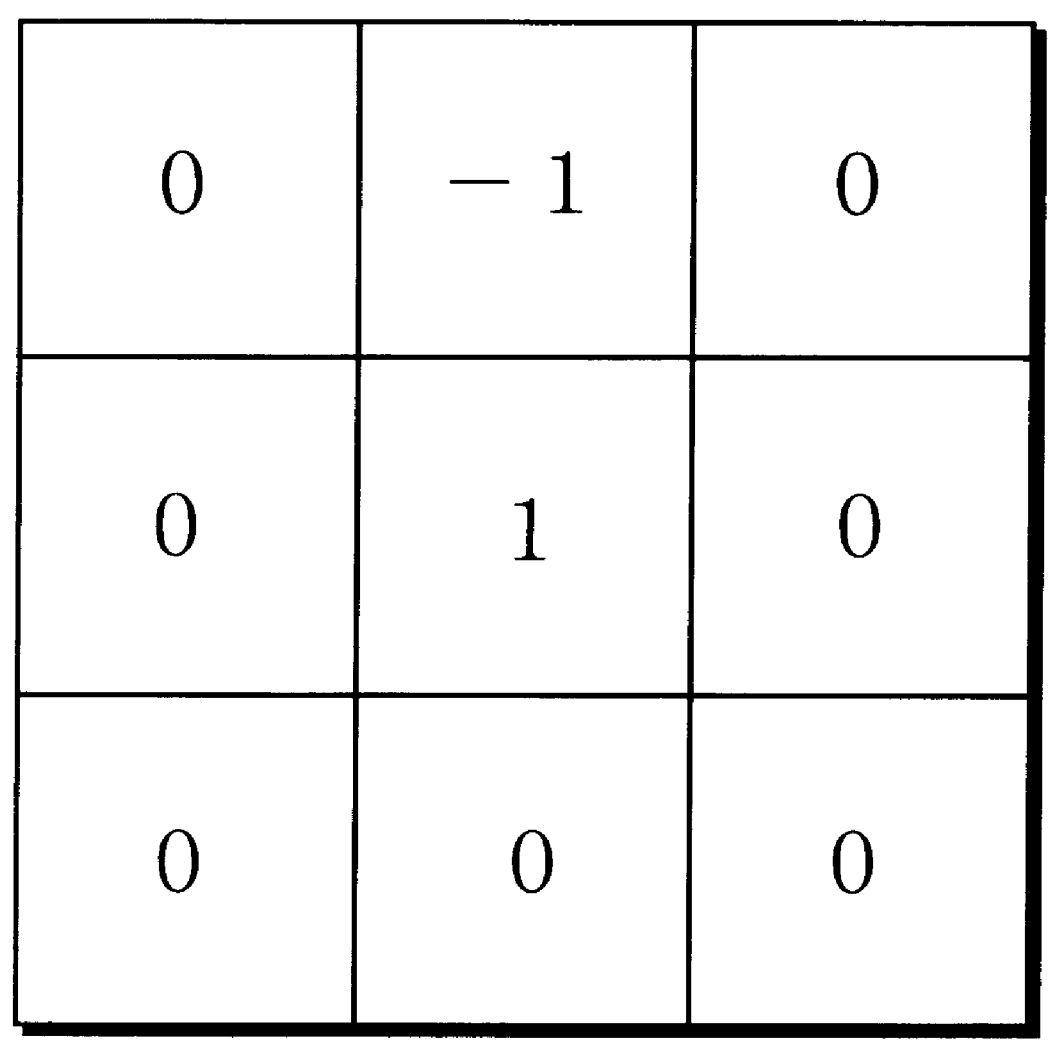

In the sharpening processing in a Y direction, a 3×3 sharpening filter as shown in FIG. 9, for example, is used. That is, letting A to I be luminance data representing respective pixels in a 3×3 matrix centered around a target pixel, as shown in FIG. 8, luminance data representing the target pixel E is converted into luminance data E expressed by the following equation (2).

$$E=E+\{(-B+E)/k\} \qquad (2)$$

If the ratio of a high frequency component added in the case of sharpening is too high, however, the value of a light and dark portion produced by a portion between points which are adjacent to each other in a column direction is large, so that the light and dark portion cannot be easily distinguished from light and dark portions in a row direction respectively produced by projected points or recessed points corresponding to points of braille which originally exist. Therefore, the value of k is found by experiments. In this example, k=5. Image data after the sharpening processing is stored in the image memory 42.

(4) Processing for producing a ternary-coded image for extracting projected points is then performed on the basis of the image data after the sharpening processing (step 4).

Figure 10:
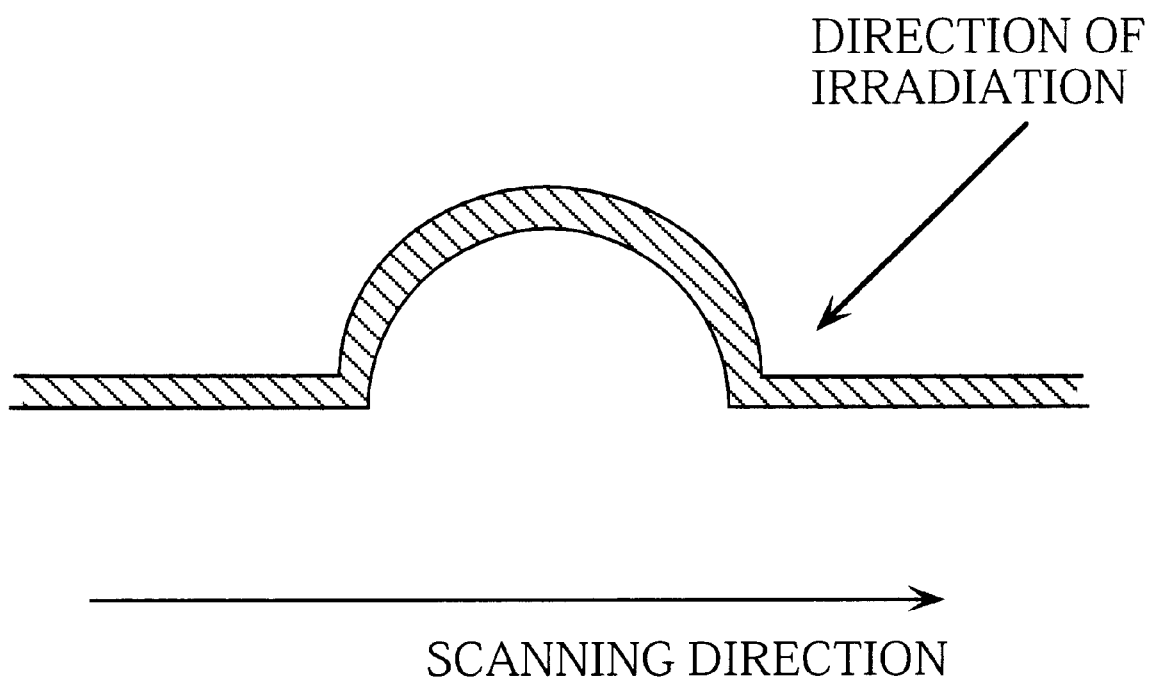
FIG. 10 is a typical diagram showing the scanning direction in a case where a ternary-coded image for extracting projected points is produced.
Figure 11A:
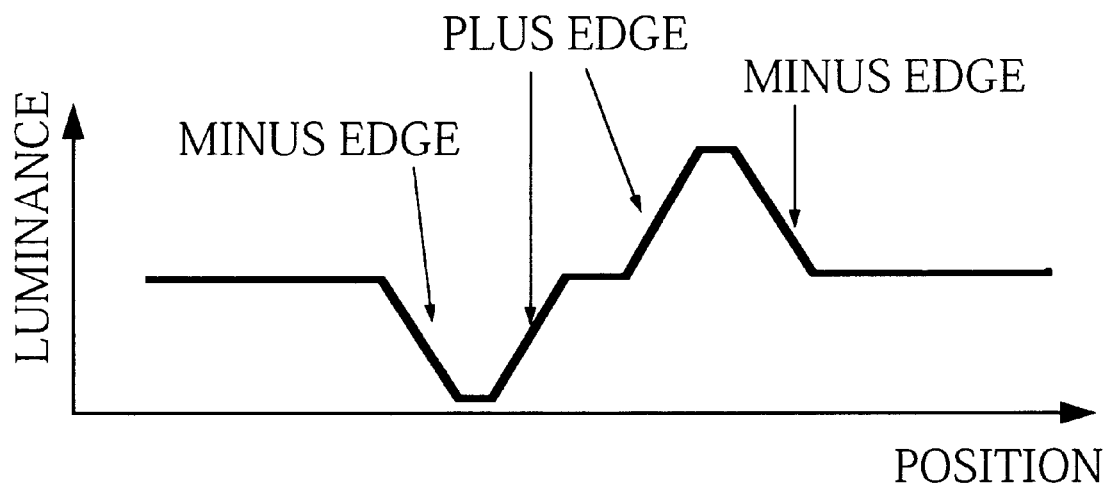
FIGS. 11a and 11b are typical diagrams showing a luminance pattern of a light and dark portion produced by a projected point and a pattern of a light and dark portion produced by a projected point which is obtained by filtering processing using a Sobel operation for emphasizing edges of projected points.

Description is made of the processing for producing a ternary-coded image for extracting projected points. As shown in FIG. 10, consider a case where the image data after the sharpening processing is scanned using the scanning direction as a direction opposite to the direction of irradiation. In this case, in a light and dark portion produced by a projected point, a luminance pattern changing in the order of "background luminance", "a dark portion (a shadow portion produced by the projected point)", "background luminance", "a light portion (a light reflecting portion produced by the projected point)", and "background luminance" is obtained, as shown in FIG. 11a. In FIG. 11a, a portion so changed that the luminance is decreased shall be called a minus edge, and a portion so changed that the luminance is increased shall be called a plus edge.

The size of the projected point corresponding to the braille is not uniform as described above, and is one corresponding to approximately 3×3 pixels. Consequently, the change in luminance is regarded as an edge (a high frequency component), whereby the image data after the sharpening processing is subjected to differentiation processing in an X direction while being scanned in the scanning direction shown in FIG. 10, so that a characteristic amount is emphasized.

Figure 12:
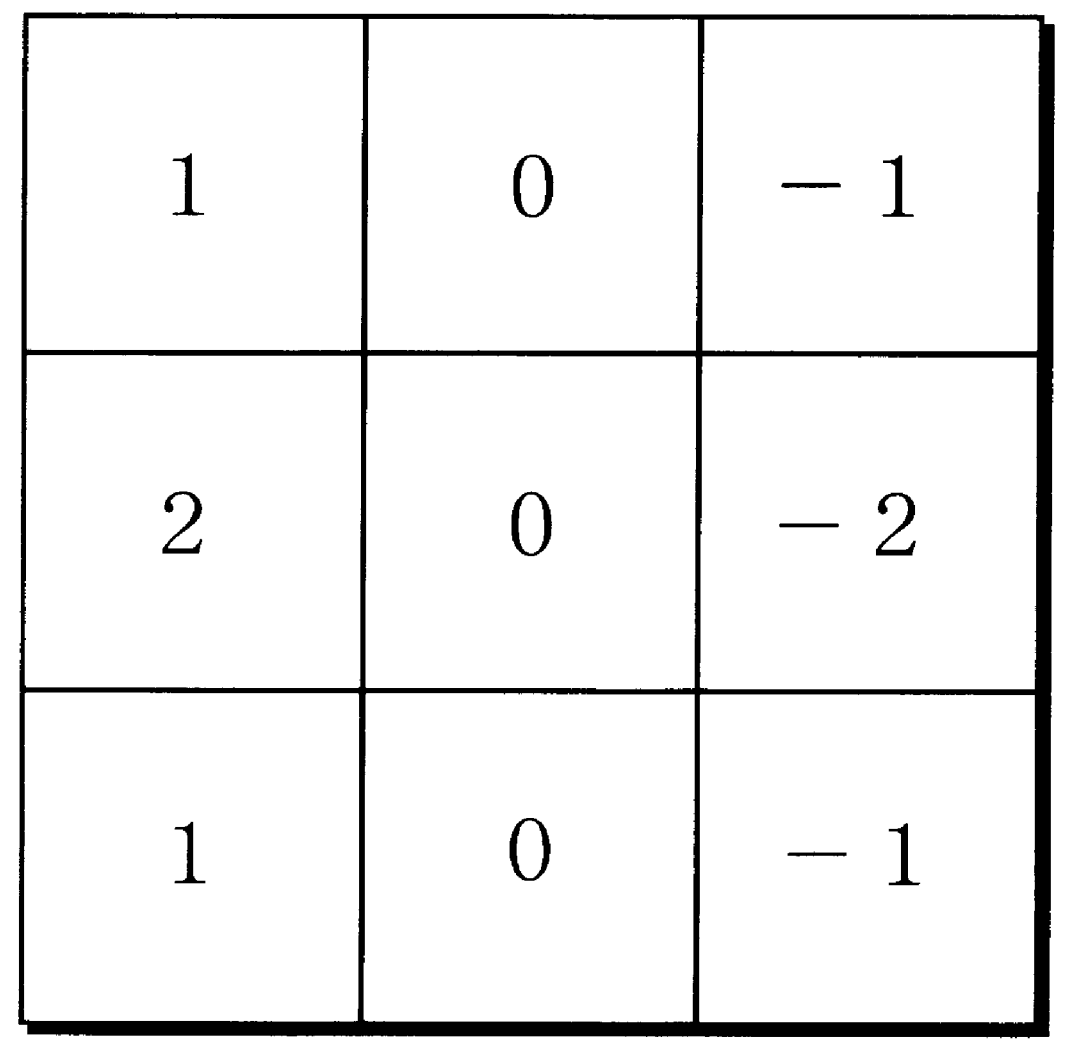

In the differentiation processing, a Sobel operation in an X direction as shown in FIG. 12, for example, is used. That is, letting A to I be luminance data representing respective pixels in a 3×3 matrix centered around a target pixel, as shown in FIG. 8, luminance data representing the target pixel E is converted into a value E expressed by the following equation (3):

$$E = (A - C + 2 \cdot D - 2 \cdot F + G - I) + 127 \tag{3}$$

In the foregoing equation (3), "127" in the right side is an offset value.

Figure 11B:
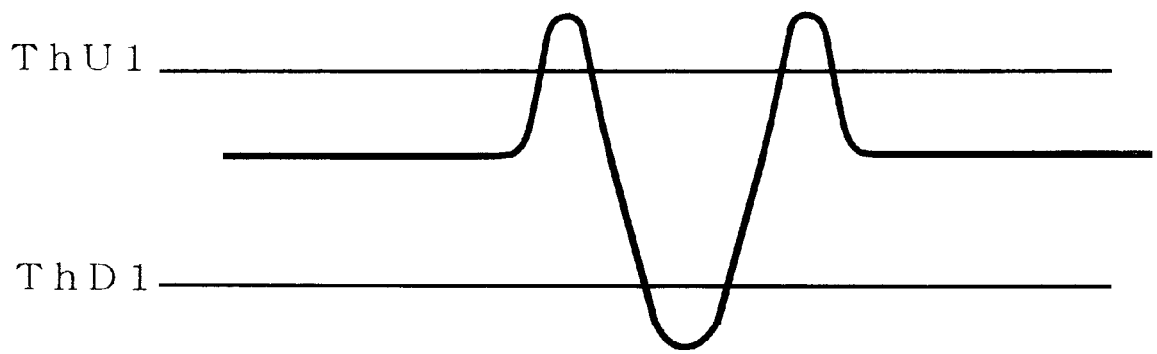

The image data after the sharpening processing is subjected to the differentiation processing using the Sobel operation, to convert the luminance pattern shown in FIG. 11a into a luminance pattern shown in FIG. 11b.

In order to obtain an image whose minus edge portion, background portion and plus edge portion are distinguished, an image obtained by the differentiation processing is subjected to ternary-coding processing using an upper threshold value ThU1 and a lower threshold value ThD1. "170", for example, is set as the upper threshold value ThU1, and "50", for example, is set as the lower threshold value ThD1. When the document in braille is a document in one-sided braille, "165", for example, is set as the upper threshold value ThU1.

The value of a pixel having a value more than the upper threshold value ThU1 is taken as a white peak value, the value of a pixel having a value less than the lower threshold value ThD1 is taken as a black peak value, and the value of a pixel having a value which is not less than the lower threshold value ThD1 nor more than the upper threshold value ThU1 is taken as an intermediate value. A pixel whose value is a white peak value shall be called a white peak point, and a pixel whose value is a black peak value shall be called a black peak point.

Figure 13:
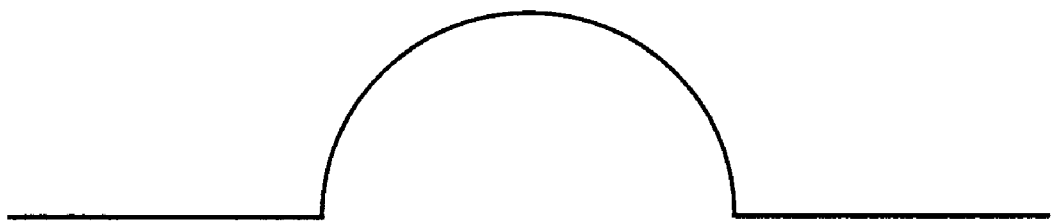
FIG. 13 is a typical diagram showing a pattern of a light and dark portion produced by a projected point in a ternary-coded image for extracting projected points.
Figure 13:
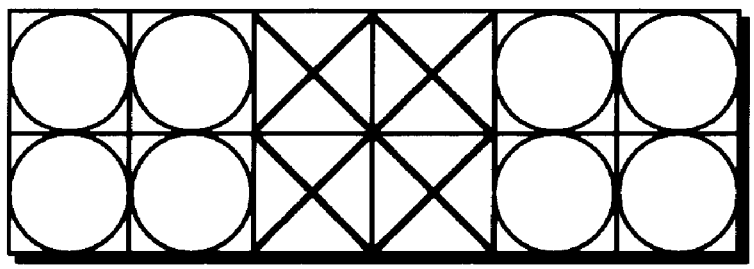
Figure 13:
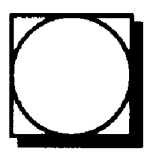
Figure 13:

When it is assumed that the size of the projected point is one corresponding to approximately 3×3 pixels in the ternary-coded image for extracting projected points thus obtained, a pattern of a light and dark portion produced by the projected point is a pattern as shown in FIG. 13. The ternary-coded image for extracting projected points is stored in the image memory 42.

(5) Processing for producing a ternary-coded image for extracting recessed points is then performed on the basis of the image data after the sharpening processing (step 5).

Figure 14:
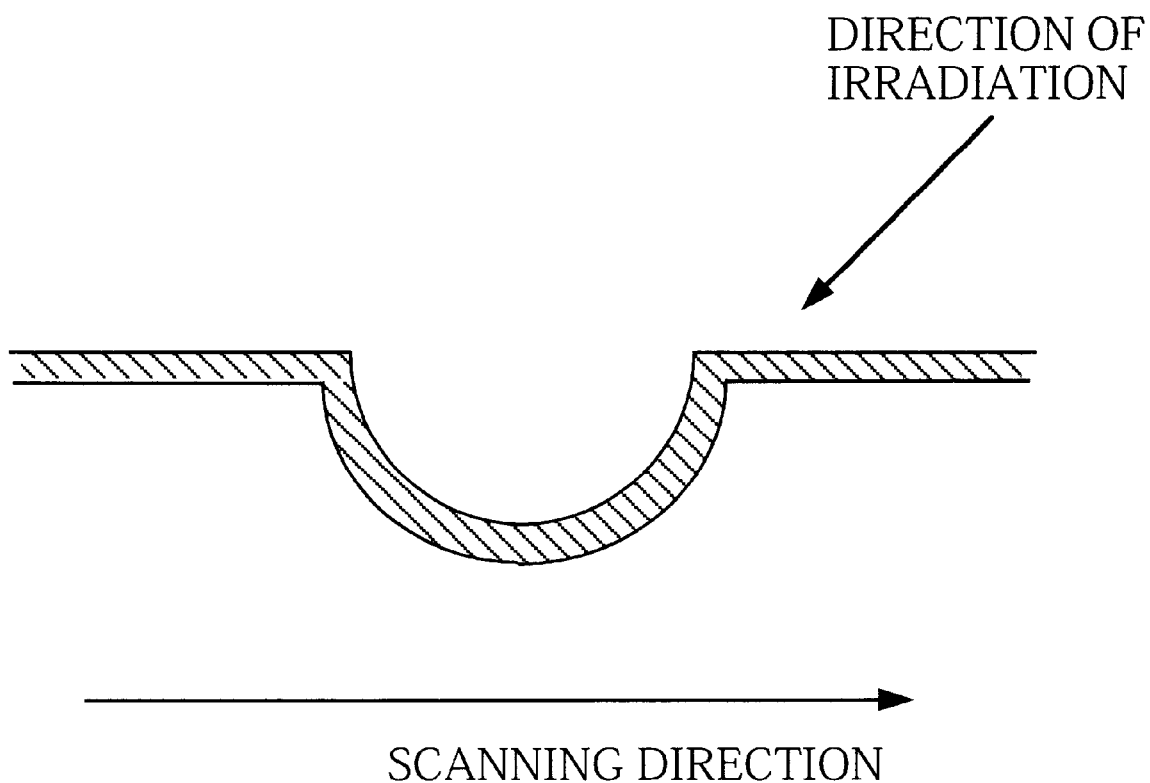
FIG. 14 is a typical diagram showing the scanning direction in a case where a ternary-coded image for extracting recessed points is produced.
Figure 15A:
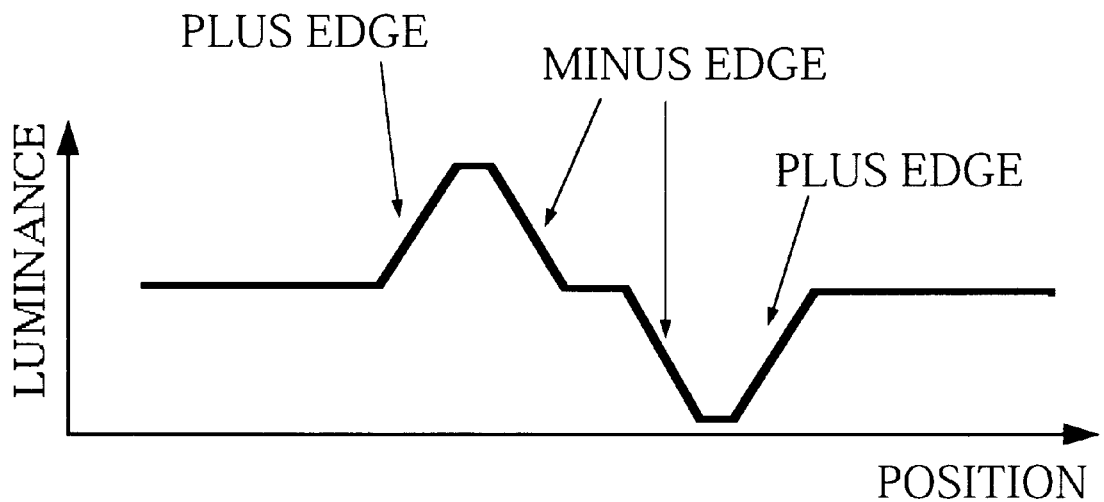
FIGS. 15a and 15b are typical diagrams showing a luminance pattern of a light and dark portion produced by a recessed point and a pattern of a light and dark portion produced by a recessed point which is obtained by filtering processing of a Sobel operation for emphasizing edges of recessed points.

Description is made of the processing for producing a ternary-coded image for extracting recessed points. As shown in FIG. 14, consider a case where the image data after the sharpening processing is scanned using the scanning direction as a direction opposite to the direction of irradiation. In this case, in a light and dark portion produced by a recessed point, a luminance pattern changing in the order of "background luminance", "a light portion (a light reflecting portion produced by the recessed point)", "background luminance", "a dark portion (a shadow portion produced by the recessed point)", and "background luminance" is obtained, as shown in FIG. 15a. In FIG. 15a, a portion so changed that the luminance is decreased shall be called a minus edge, and a portion so changed that the luminance is increased shall be called a plus edge.

The image data after the sharpening processing is subjected to differentiation processing in an X direction while being scanned in the scanning direction shown in FIG. 14, so that a characteristic amount is emphasized.

Figure 16:
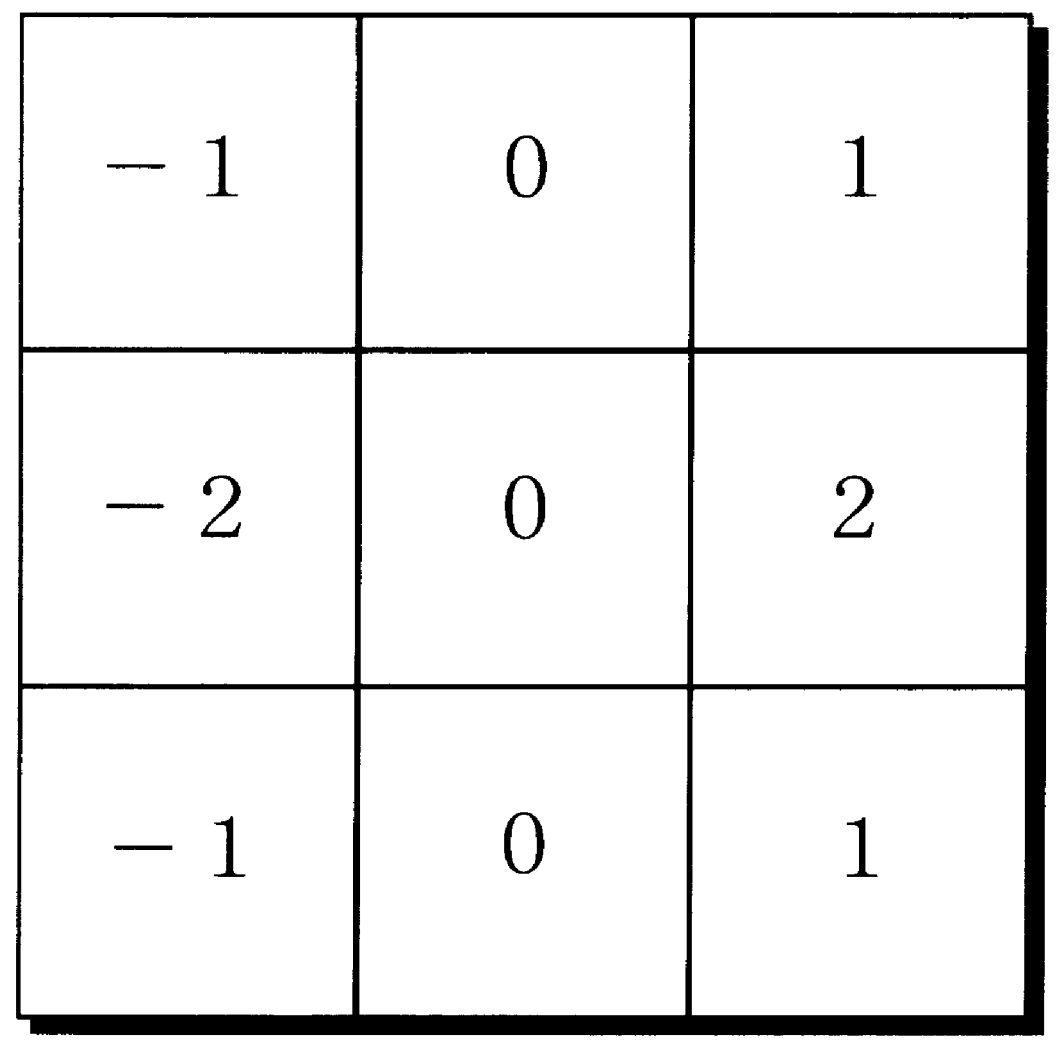

In the differentiation processing, a Sobel operation in an X direction as shown in FIG. 16, for example, is used. That is, letting A to I be luminance data representing respective pixels in a 3×3 matrix centered around a target pixel, as shown in FIG. 8, luminance data representing the target pixel E is converted into a value E expressed by the following equation (4). Weighting factors of the Sobel operation shown in FIG. 16 are opposite in sign to those of the Sobel operation shown in FIG. 12.

$$E = (-A + C - 2 \cdot D + 2 \cdot F - G + I) + 127 \tag{4}$$

Figure 15B:
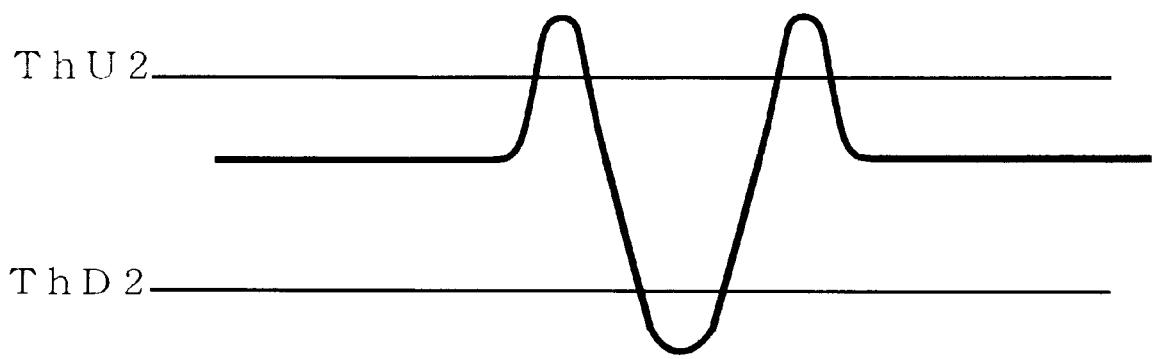

The image data after the sharpening processing is subjected to the differentiation processing using the Sobel operation, to convert the luminance pattern shown in FIG. 15a into a luminance pattern shown in FIG. 15b.

In order to obtain an image whose minus edge portion, background portion and plus edge portion are distinguished, an image obtained by the differentiation processing using the Sobel operation is subjected to ternary-coding processing using an upper threshold value ThU2 and a lower threshold value ThD2. "155", for example, is set as the upper threshold value ThU2, and "50", for example, is set as the lower threshold value ThD2.

The value of a pixel having a value more than the upper threshold value ThU2 is taken as a white peak value, the value of a pixel having a value less than the lower threshold value ThD2 is taken as a black peak value, and the value of a pixel having a value which is not less than the lower threshold value ThD2 nor more than the upper threshold value ThU2 is taken as an intermediate value. A pixel whose value is a white peak value shall be called a white peak point, and a pixel whose value is a black peak value shall be called a black peak point.

Figure 17:
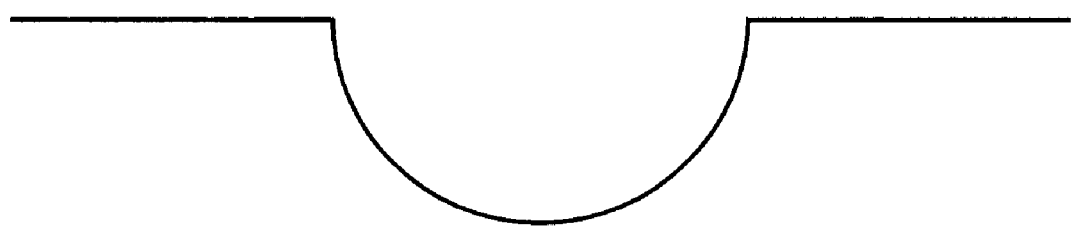
FIG. 17 is a typical diagram showing a pattern of a light and dark portion produced by a recessed point in a ternary-coded image for extracting recessed points.
Figure 17:
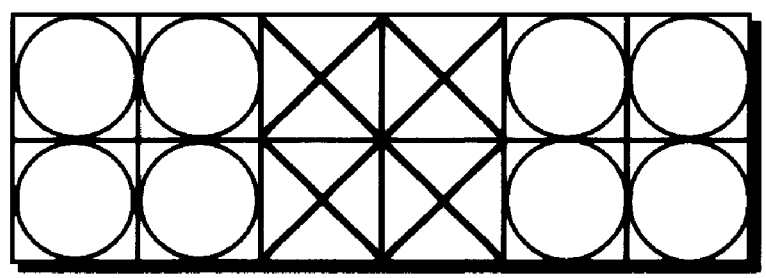
Figure 17:
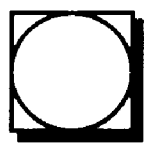
Figure 17:
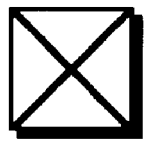

When it is assumed that the size of the projected point is one corresponding to approximately 3×3 pixels in the ternary-coded image for extracting recessed points thus obtained, a pattern of a light and dark portion produced by projected point is a pattern as shown in FIG. 17. The ternary-coded image for extracting recessed points is stored in the image memory 42.

(6) Processing for producing a binary-coded image representing projected points and a binary-coded image representing recessed points is then performed by pattern matching (step 6).

Figure 18A:
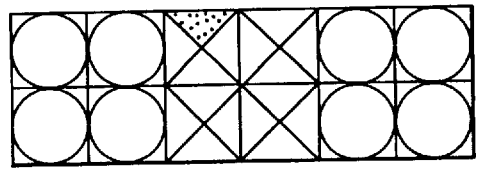
FIGS. 18a, 18b, 18c, 18d and 18e are typical diagrams showing an example of a template image used in producing a binary-coded image representing projected points or a binary-coded image representing recessed points.
Figure 18B:
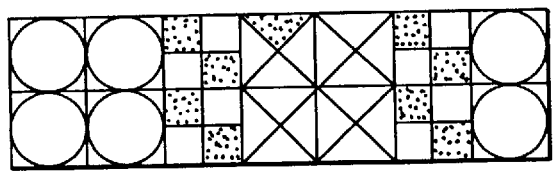
Figure 18C:
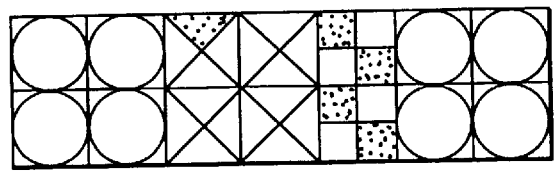
Figure 18D:
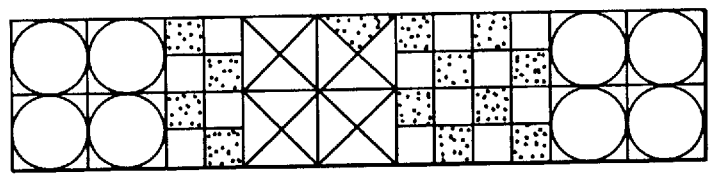
Figure 18E:
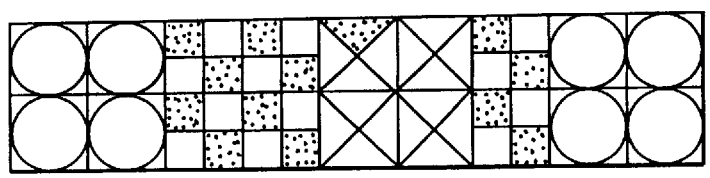
Figure 18F:
FIG. 18f is a typical diagram showing the definition of signs of pixels in FIGS. 18a, 18b, 18c, 18d and 18e.
Figure 18F:
Figure 18F:
Figure 18F:

The ternary-coded image for extracting projected points and the ternary-coded image for extracting recessed points are subjected to template matching using a 6×2 template shown in FIG. 18a, for example, while being scanned in an X direction. Signs of pixels in templates shown in FIGS. 18a to 18e are defined as shown in FIG. 18f. In this case, the template matching is alternately performed for each pixel between the ternary-coded image for extracting projected points and the ternary-coded image for extracting recessed points. For example, when a certain target pixel in the ternary-coded image for extracting projected points is subjected to template matching, the same target pixel in the ternary-coded image for extracting recessed points is subjected to template matching.

The size of the projected point (or the recessed point) differs depending on a document in braille. Therefore, it is preferable that the template matching is performed using all the templates shown in FIGS. 18a to 18e. For convenience of illustration, the template matching shall be performed using only the template shown in FIG. 18a.

In the ternary-coded image for extracting projected points, when a 6×2 region where matching is to be performed which corresponds to a target pixel does not coincide with the template, it is judged that the target pixel is a background, whereby the value of the target pixel is set to "0". In the ternary-coded image for extracting projected points, when a 6×2 region where matching is to be performed which corresponds to a target pixel coincides with the template, it is judged that the target pixel is a projected point, whereby the value of the target pixel is set to "1".

In the ternary-coded image for extracting recessed points, when a 6×2 region where matching is to be performed which corresponds to a target pixel does not coincide with the template, it is judged that the target pixel is a background, whereby the value of the target pixel is set to "0". In the ternary-coded image for extracting recessed points, when a 6×2 region where matching is to be performed which corresponds to a target pixel coincides with the template, it is judged that the target pixel is a recessed point, whereby the value of the target pixel is set to "1".

Figure 19A:
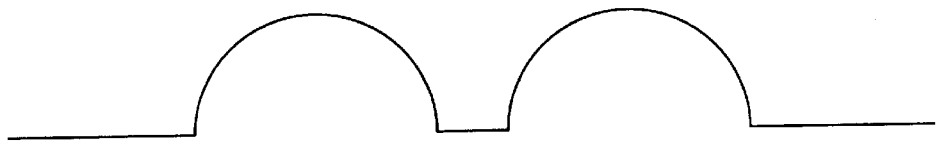
FIGS. 19a, 19b and 19c are typical diagrams showing that the same pattern as a pattern of a light and dark portion produced by one recessed point appears in a portion where two projected points are continued in a row direction in a ternary-coded image for extracting recessed points.
Figure 19B:
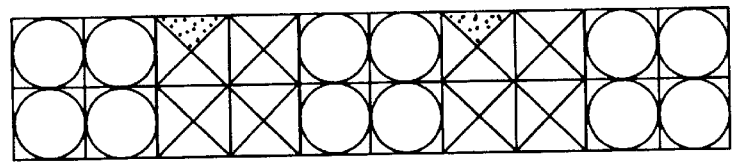

Spacing between the projected points which are adjacent to each other in a row direction is very narrow, i.e., spacing corresponding to 3 to 4 pixels. When two projected points are adjacent to each other in a row direction, as shown in FIG. 19a, therefore, a pattern of light and dark portions respectively produced by the projected points continuously appears in the ternary-coded image for extracting projected points, as shown in FIG. 19b. The two projected points are extracted by the above-mentioned template matching from the pattern as shown in FIG. 19b.

Figure 19C:
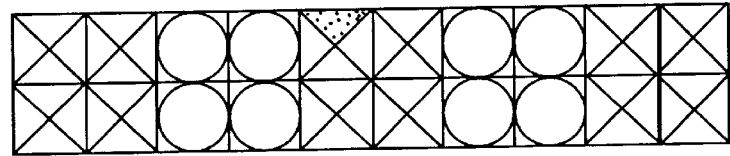

When the two projected points are adjacent to each other in a row direction, as shown in FIG. 19a, however, a pattern of a position between the two projected points is the same as the pattern of a light and dark portion produced by one recessed point, as shown in FIG. 19c in the ternary-coded image for extracting recessed points. That is, the recessed point may be extracted, although there is no recessed point.

Similarly, when the two recessed points are adjacent to each other in a row direction, a pattern of a position between the two recessed points is the same as the pattern of a light and dark portion produced by one projected point in the ternary-coded image for extracting projected points. That is, the projected point may be extracted, although there is no projected point.

In a case where the ternary-coded image for extracting projected points and the ternary-coded image for extracting recessed points are subjected to the template matching while being scanned in an X direction, when a projected point is extracted with respect to a target pixel in the ternary-coded image for extracting projected points, a peripheral pixel of a corresponding target pixel in the ternary-coded image for extracting recessed points is so masked as not to be used for extracting recessed points. On the other hand, when a recessed point is extracted with respect to a target pixel in the ternary-coded image for extracting recessed points, a peripheral pixel of a corresponding target pixel in the ternary-coded image for extracting projected points is so masked as not to be used for extracting projected points.

Figure 20:
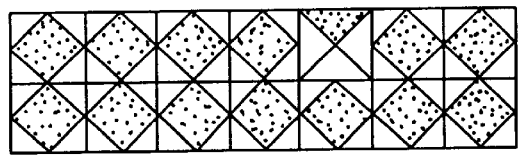
FIG. 20 is a typical diagram showing pixels to be masked in the other ternary-coded image in a case where projected points or recessed points are extracted.
Figure 20:
Figure 20:

An example of a pixel to be masked in the other ternary-coded image in a case where the projected point or the recessed point is extracted is illustrated in FIG. 20.

The binary-coded image representing projected point and the binary-coded image representing recessed point which are thus obtained are stored in the image memory 42.

[3] Description of Braille Recognition Processing by Braille Recognition Processing Section 44

Braille recognition processing corresponding to a binary-coded image representing projected points and braille recognition processing corresponding to a binary-coded image representing recessed points are the same and hence, description is now made of only braille recognition processing corresponding to the binary-coded image representing projected points.

Figure 21:
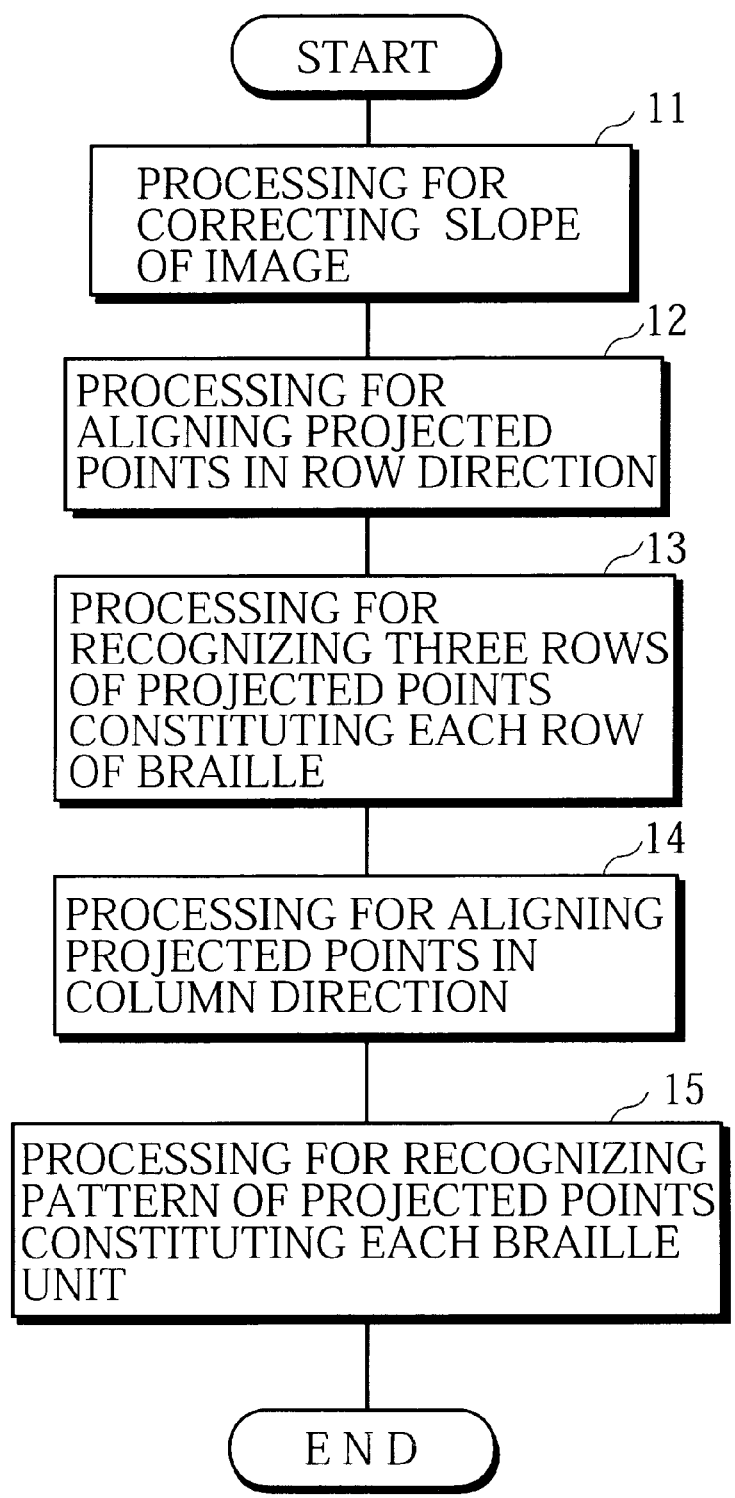
FIG. 21 is a flow chart showing the procedure for braille recognition processing performed by a braille recognition processing section.

FIG. 21 shows the procedure for braille recognition processing performed by the braille recognition processing section 44.

(1) Processing for correcting the slope of the binary-coded image representing projected points is first performed (step 11).

In the processing for correcting the slope of the binary-coded image representing projected points, an angle of inclination of a direction of a row of projected points to an X direction of XY coordinates of the image memory 42 is first found. The position of each of projected points on the binary-coded image representing projected points shall be represented by an XY coordinate system using the peak at an upper left end of the image memory 42 as its origin. The binary-coded image representing projected points is first subjected to Hough transform, to respectively find the distances $\rho$ of straight lines respectively passing through the projected points and having angles of $\theta$ to a horizontal direction X from the origin are respectively found. $\rho$ is given by the following equation (5):

$$\rho = x \cdot \cos\theta + y \cdot \sin\theta \tag{5}$$

For each of a plurality of angles $\theta$ shifted by a predetermined angle, the distances $\rho$ of the straight lines respectively passing through the projected points and having the angle $\theta$ to an X direction from the origin are found.

Figure 22:
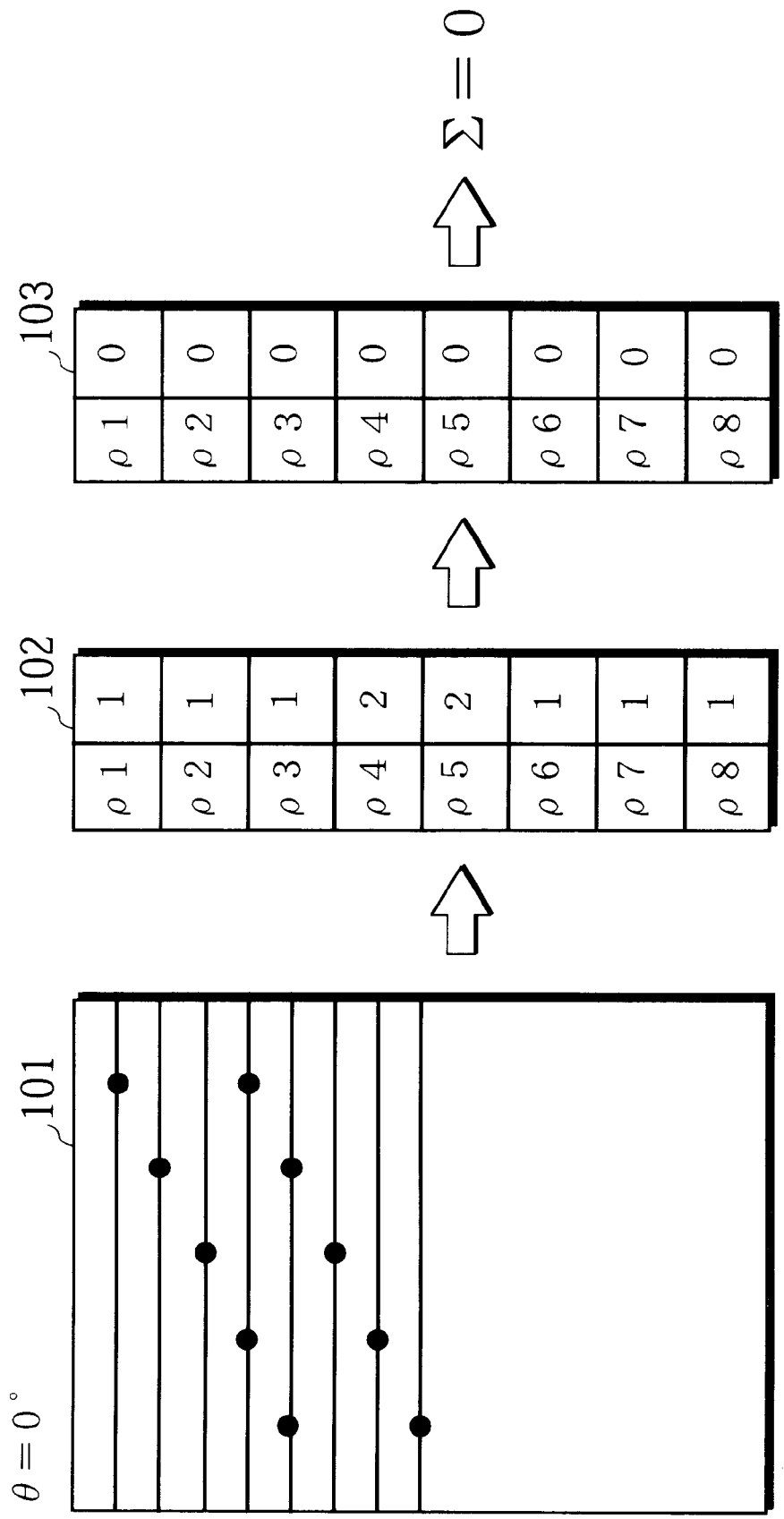
FIG. 22 is a typical diagram showing the results of Hough transform corresponding to $\theta=0°$.

An image 101 shown in FIG. 22 indicates straight lines respectively passing through projected points and having an angle $\theta$ of 0° to an X direction. An image 111 shown in FIG. 23 indicates straight lines respectively passing through projected points and having an angle $\theta$ of $\alpha$° to an X direction.

Figure 23:
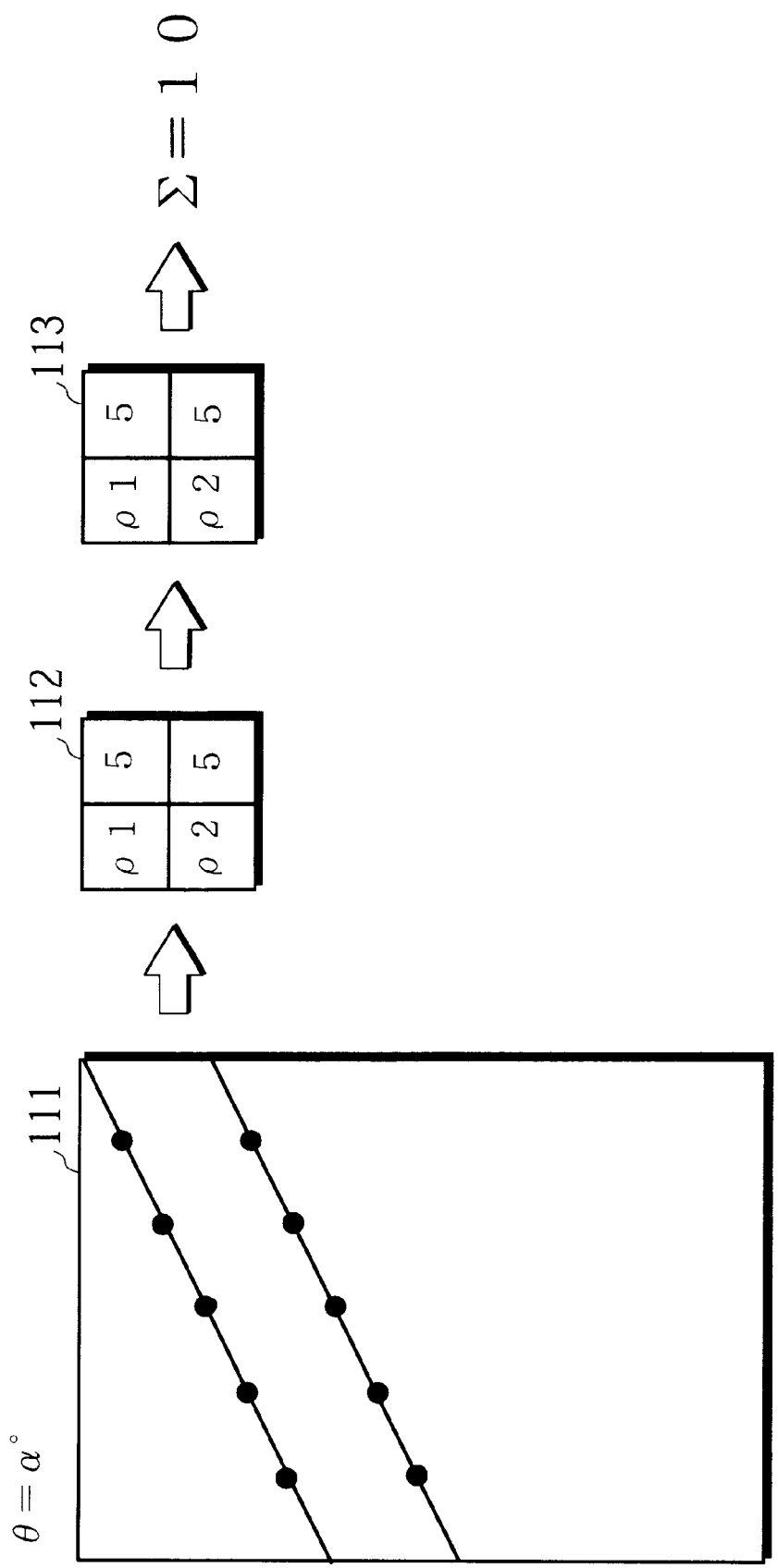
FIG. 23 is a typical diagram showing the results of Hough transform corresponding to $\theta=\alpha°$.

A distribution of frequencies each representing the number of straight lines having the same distance $\rho$ is then found for each angle $\theta$. That is, a distribution of frequencies each representing the number of projected points existing on each of the straight lines is calculated for each angle $\theta$. Table 102 in FIG. 22 shows a distribution of frequencies each representing the number of straight lines having the same distance $\rho$ in a case where the angle $\theta$ is 0°. Table 112 in FIG. 23 shows a distribution of frequencies each representing the number of straight lines having the same distance $\rho$ in a case where the angle $\theta$ is $\alpha$°.

The maximum value of the numbers of straight lines respectively having the same distances $\rho$ in the distributions of frequencies each representing the number of straight lines having the same distance $\rho$ for all the angles $\theta$ is taken as max. In the examples shown in FIGS. 22 and 23, max=5. The numbers of straight lines respectively having the same distances $\rho$ which are not more than max/2 in the distributions of frequencies each representing the number of straight lines having the same distance ρ for all the angles θ are set to zero. Table 103 in FIG. 22 shows a distribution of frequencies in a case where the numbers of straight lines respectively corresponding to the distances ρ which are not more than 2.5 in the distribution of frequencies corresponding to θ=0° are set to zero. Table 113 in FIG. 23 shows a distribution of frequencies in a case where the numbers of straight lines respectively corresponding to the distances θ which are not more than 2.5 in the distribution of frequencies corresponding to θ=α° are set to zero.

The sum of the frequencies is found for each of the angles θ on the basis of the distribution of frequencies for the angle θ in a case where the numbers of straight lines respectively corresponding to the distances ρ which are not more than max/2 are set to zero. In the example shown in FIG. 22, the sum Σ of the frequencies is zero. In the example shown in FIG. 23, the sum Σ of the frequencies is 10. An angle θ at which the sum Σ is the largest out of the sums of the frequencies for the respective angles θ is detected as an angle of inclination of the binary-coded image representing projected points. In the examples shown in FIGS. 22 and 23, the angle α° at which the sum Σ is larger is detected as an angle of inclination of the binary-coded image representing projected points.

When the angle of inclination of the binary-coded image representing projected points is thus detected, the binary-coded image representing projected points is rotated by the detected angle of inclination in a direction opposite to the direction of inclination, so that a binary-coded image representing projected points having no slope is obtained.

(2) The binary-coded image representing projected points which is subjected to the slope correction processing is then subjected to processing for aligning projected points in a row direction (step 12).

Figure 24C:
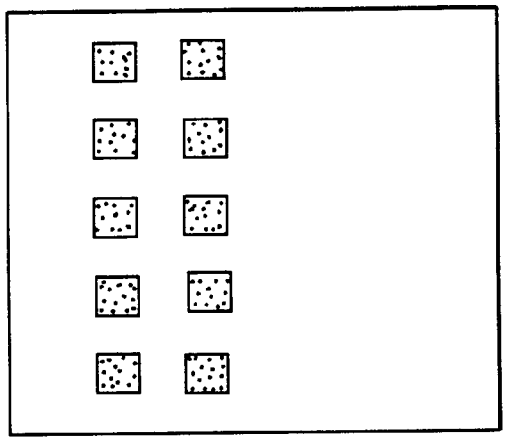
FIGS. 24a, 24b and 24c are explanatory views for explaining processing for aligning projected points in a row direction.
Figure 24B:
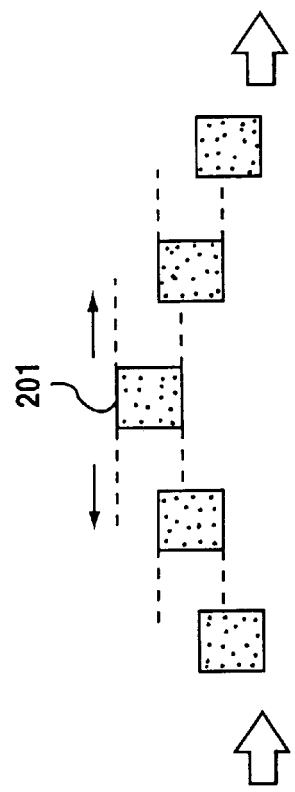
Figure 24A:
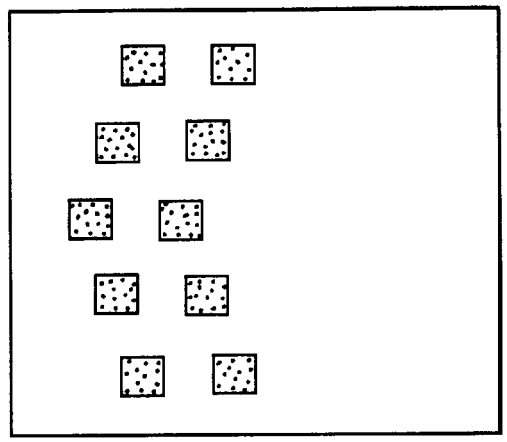

Description is made of the processing for aligning projected points in a row direction by taking a binary-coded image representing projected points shown in FIG. 24*a* as an example. Description is now made of processing in a case where the projected points in the first row are aligned. A y-coordinate range from a y-coordinate at an upper end of each of the projected points to a y-coordinate at a lower end thereof shall be referred to as a y-coordinate range of the projected point.

As shown in FIG. 24*b*, a projected point 201 at the uppermost position is taken as a target projected point, to retrieve a projected point having a y-coordinate range at least a part of which is overlapped with the y-coordinate range of the target projected point leftward from the target projected point. When the projected point having a y-coordinate range at least a part which is overlapped with the y-coordinate range of the target projected point is retrieved, the retrieved projected point is taken as a target projected point, to retrieve a projected point having a y-coordinate range at least a part of which is overlapped with the y-coordinate range of the target projected point leftward from the target projected point. When the projected point having a y-coordinate range at least a part of which is overlapped with the y-coordinate range of the target projected point is not retrieved, the leftward retrieval is terminated.

On the other hand, the projected point 201 at the uppermost position is taken as a target projected point, to retrieve a projected point having a y-coordinate range at least a part of which is overlapped with the y-coordinate range of the target projected point rightward from the target projected point. When the projected point having a y-coordinate range at least a part of which is overlapped with the y-coordinate range of the target projected point is retrieved, the retrieved projected point is taken as a target projected point, to retrieve a projected point having a y-coordinate range at least a part of which is overlapped with the y-coordinate range of the target projected point rightward from the target projected point. When the projected point having a y-coordinate range at least a part of which is overlapped with the y-coordinate range of the target projected point is not retrieved, the rightward retrieval is terminated.

An intermediate value between the y-coordinate value at the upper end of the projected point at the uppermost position and the y-coordinate value at the lower end of the projected point at the lowermost position out of the plurality of projected points thus retrieved is determined as a y-coordinate value in the first row of the projected points. Each of the retrieved projected points is so moved in a Y direction that the position in the center at the height of each of the retrieved projected points has the determined y-coordinate value in the first row of the projected points. Consequently, the projected points in the first row are aligned in a row direction.

The projected points are similarly aligned in a row direction with respect to the second and the subsequent rows. The binary-coded image representing projected points shown in FIG. 24*a* is thus converted into a binary-coded image representing projected points shown in FIG. 24*c*.

Figure 25:
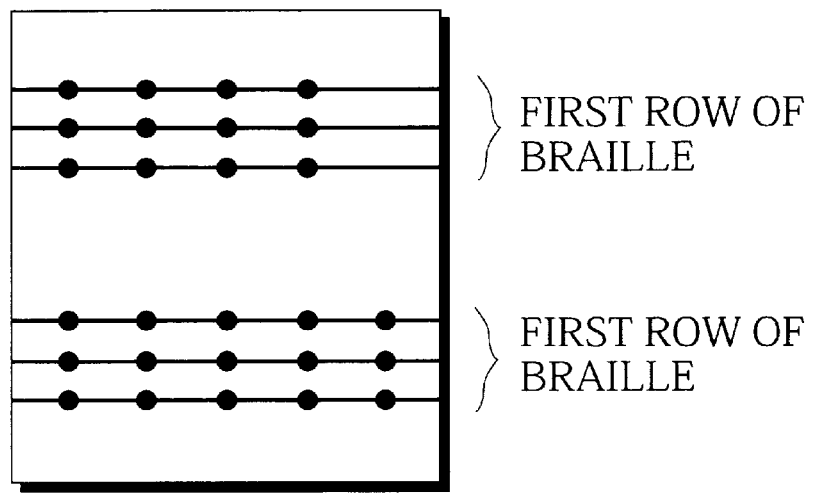
FIG. 25 is a typical diagram showing three rows of projected points constituting each row of braille.

(3) When the processing for aligning projected points in a row direction is terminated, processing for recognizing three rows of projected points constituting each row of braille is performed, as shown in FIG. 25 (step 13).

In this processing, upper four rows of projected points are first selected. Let L1, L2, L3, and L4 be selected four rows of projected points, d1 be spacing between L1 and L2, d2 be spacing between L2 and L3, and d3 be spacing between L3 and L4, as shown in FIG. 26.

Figure 26:
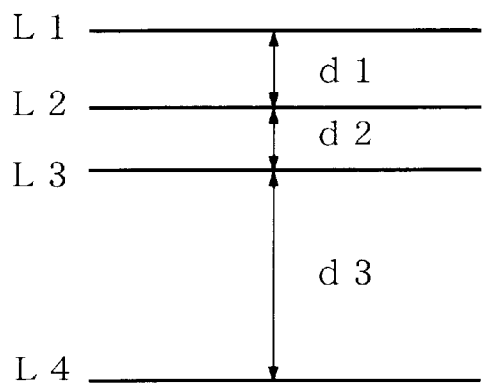
FIG. 26 is an explanatory view for explaining processing for recognizing three rows of projected points constituting each row of braille.

As shown in FIG. 26, when the spacing d1 and the spacing d2 are in a defined range, and the spacing d3 is outside the defined range, it is recognized that the upper three rows of projected points L1, L2, and L3 out of the selected four rows are three rows of projected points constituting the first row of braille.

Figure 27:
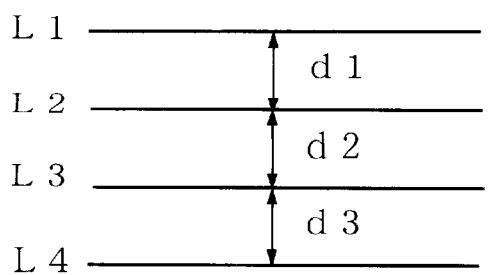
FIG. 27 is an explanatory view for explaining processing for recognizing three rows of projected points constituting each row of braille.

As shown in FIG. 27, when all the spacing d1, the spacing d2 and the spacing d3 are in the defined range, it is judged that a row of projected points which should be inherently one row is divided into two rows. Therefore, the respective numbers of projected points K1, K2, K3, and K4 respectively existing on the selected four rows of projected points L1 to L4 are compared with each other. In this example, it is assumed that the relationship between the respective numbers of projected points is K2<K3<K1<K4.

It is assumed that there is no row of projected points L2 whose number is the smallest, and it is judged whether or not (d1+d2) is in the defined range. If (d1+d2) is in the defined range, it is recognized that the three rows L1, L3, and L4 excluding the row of projected points L2 are three rows of projected points constituting the first row of braille.

If (d1+d2) is outside the defined range, it is assumed that there is no row of projected points L3 whose number is the second smallest, and it is judged whether or not (d2+d3) is in the defined range. If (d2+d3) is in the defined range, it is recognized that the three rows L1, L2 and L4 excluding the row of projected points L3 are three rows of projected points constituting the first row of braille.

If (d2+d3) is outside the defined range, it is recognized that the three rows L2, L3, and L4 excluding the row of projected points L1 whose number is the third smallest are three rows of projected points constituting the first row of braille.

(4) When the processing for recognizing three rows of projected points constituting each row of braille is terminated, processing for aligning projected points in a column direction is performed (step 14).

The processing for aligning projected points in a column direction is performed for each row of braille. An x-coordinate range from an x-coordinate at a left end of each of the projected points to an x-coordinate at a right end thereof shall be referred to as an x-coordinate range of the projected point.

Figure 28:
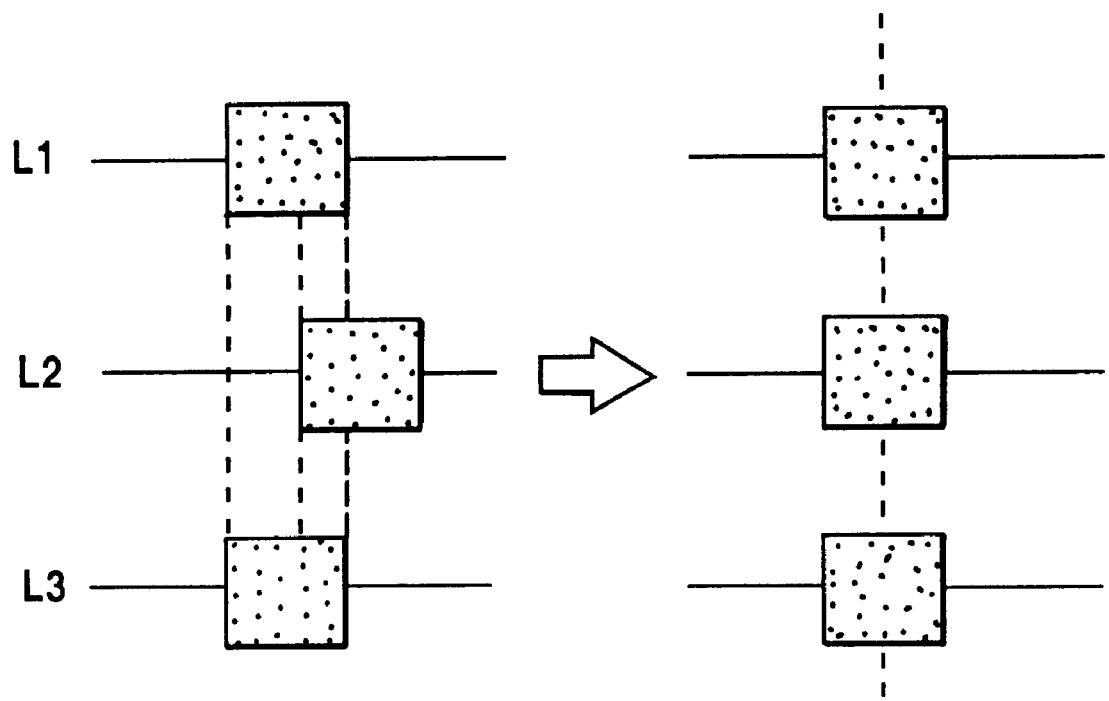
FIG. 28 is an explanatory view for explaining processing for aligning projected points in a column direction.

In the processing for aligning projected points in a column direction, it is judged that the projected points whose x-coordinate ranges are partially overlapped with each other out of the adjacent rows of projected points out of the three rows of projected points L1, L2, and L3 constituting a row of braille are projected points existing on the same column of projected points, as shown in FIG. 28. An intermediate value between the x-coordinate at the left end of the projected point at the leftmost position and the x-coordinate at the right end of the projected point at the rightmost position out of the plurality of projected points which are judged to exist on the same column of projected points is determined as an x-coordinate value in the column of projected points. The plurality of projected points are so moved in an X direction that the central position in the lateral direction of the plurality of projected points which are judged to exist on the column of projected points has the determined x-coordinate value in the column of projected points. Consequently, the plurality of projected points which are judged to exist on the same column are thus aligned in a column direction.

(5) When the processing for aligning projected points in a column direction is terminated, processing for recognizing a pattern of projected points constituting each braille unit (step 15).

The processing for recognizing a pattern of projected points constituting braille is performed for each row of braille.

Figure 29:
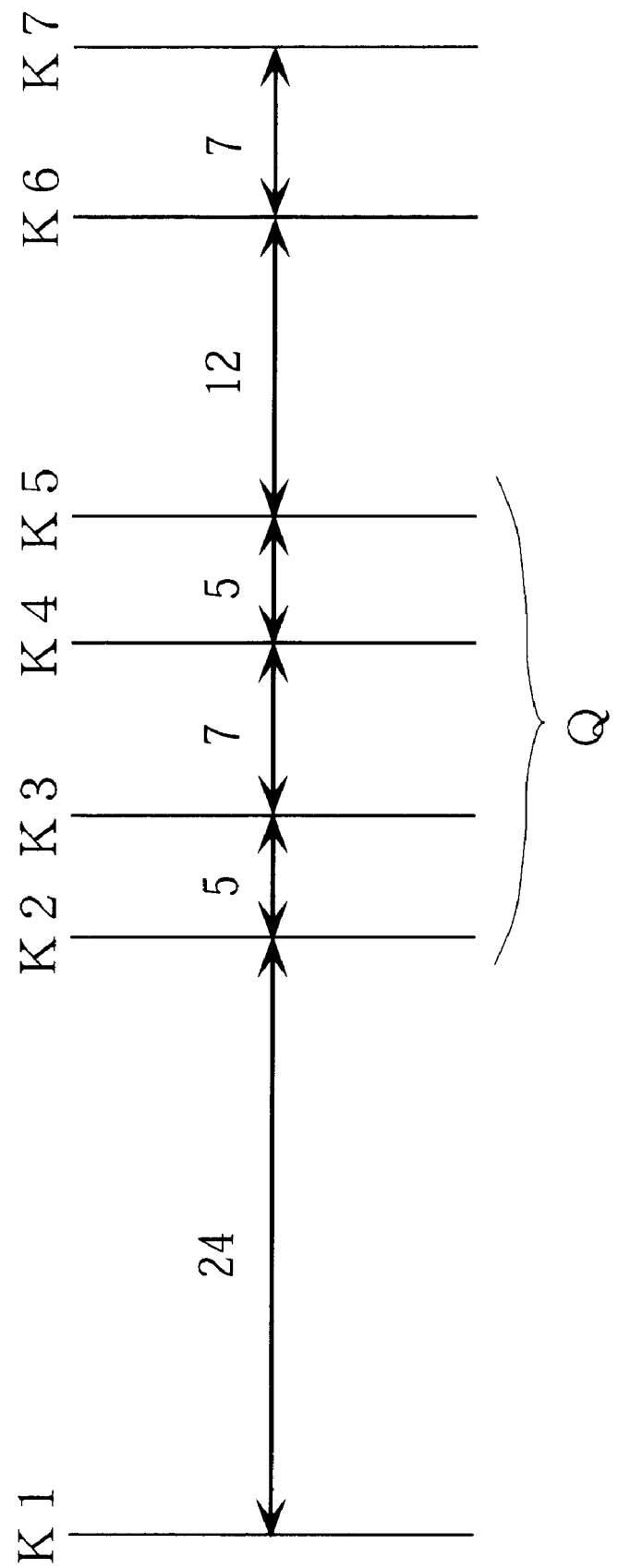

As shown in FIG. 29, spacing between adjacent ones of columns K1 to K7 in which projected points exist is found in a row of braille currently paid attention to.

Figure 34:
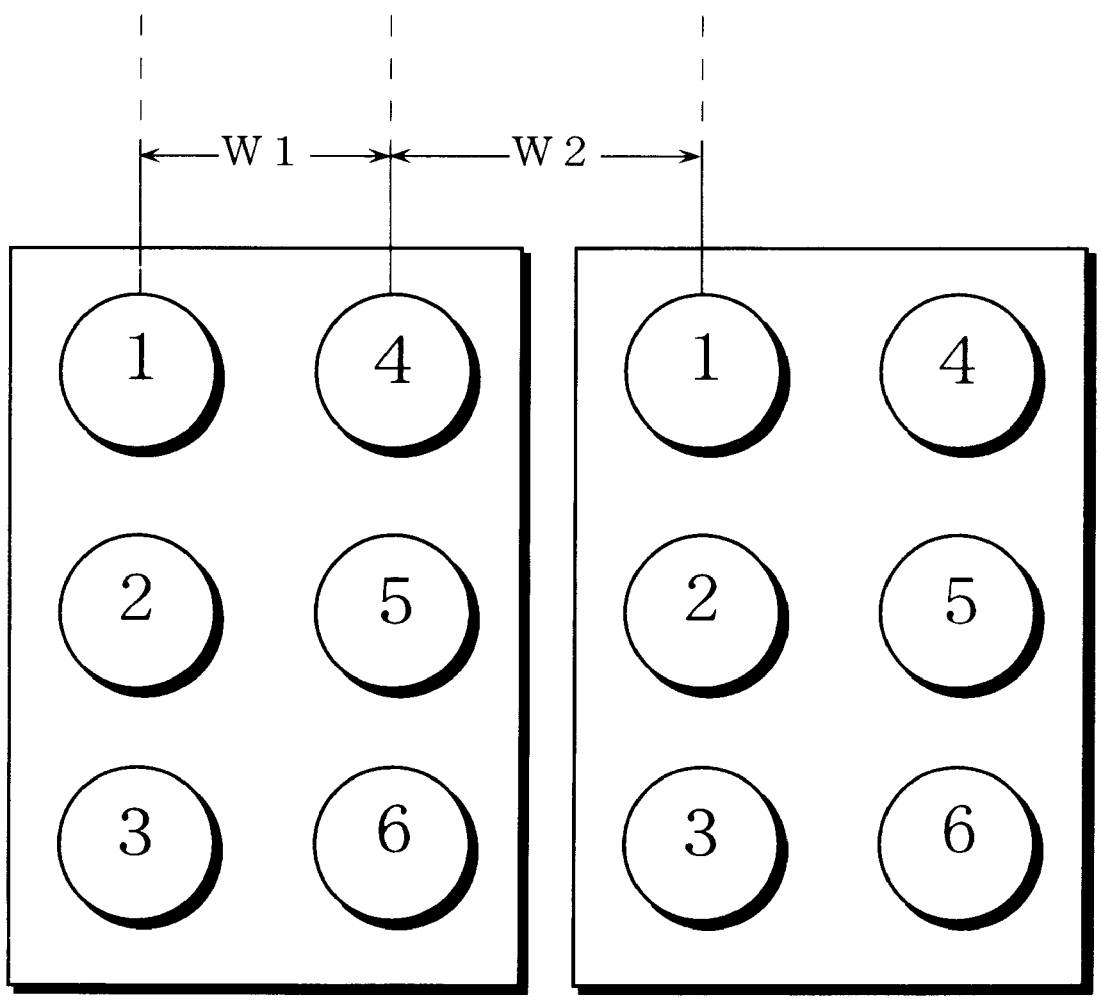
FIG. 34 is an explanatory view for explaining braille.

It is almost determined how long the spacing W1 between projected points which are adjacent to each other in the lateral direction in the same masu (hereinafter referred to as a character width) (see FIG. 34) and the spacing W2 between projected points which are adjacent to each other in the lateral direction between adjacent masus (hereinafter referred to as character spacing) are. Further, it is determined that the character width is smaller than the character spacing.

As shown in FIG. 29, one portion where a larger number of columns out of the columns K1 to K7 in which projected points exist are continued at spacing which is not more than a defined value, for example, not more than 10 (hereinafter referred to as a region Q for judging a character width and character spacing) is extracted. In the extracted portion, an average value (a first average value) of spacings between the odd-numbered columns and an average value (a second average value) of spacings between the even-numbered columns are respectively calculated. The smaller one of the first average value and the second average value is determined as the character width W1, and the larger one of them is determined as the character spacing W2.

In the example shown in FIG. 29, the first average value is 5, and the second average value is 7, whereby the character width W1 is determined as 5, and the character spacing W2 is determined as 7. In FIG. 29, the shortest spacing between the columns may be determined as the character width W1, and the second shortest spacing between the columns may be determined as the character spacing W2.

Figure 30:
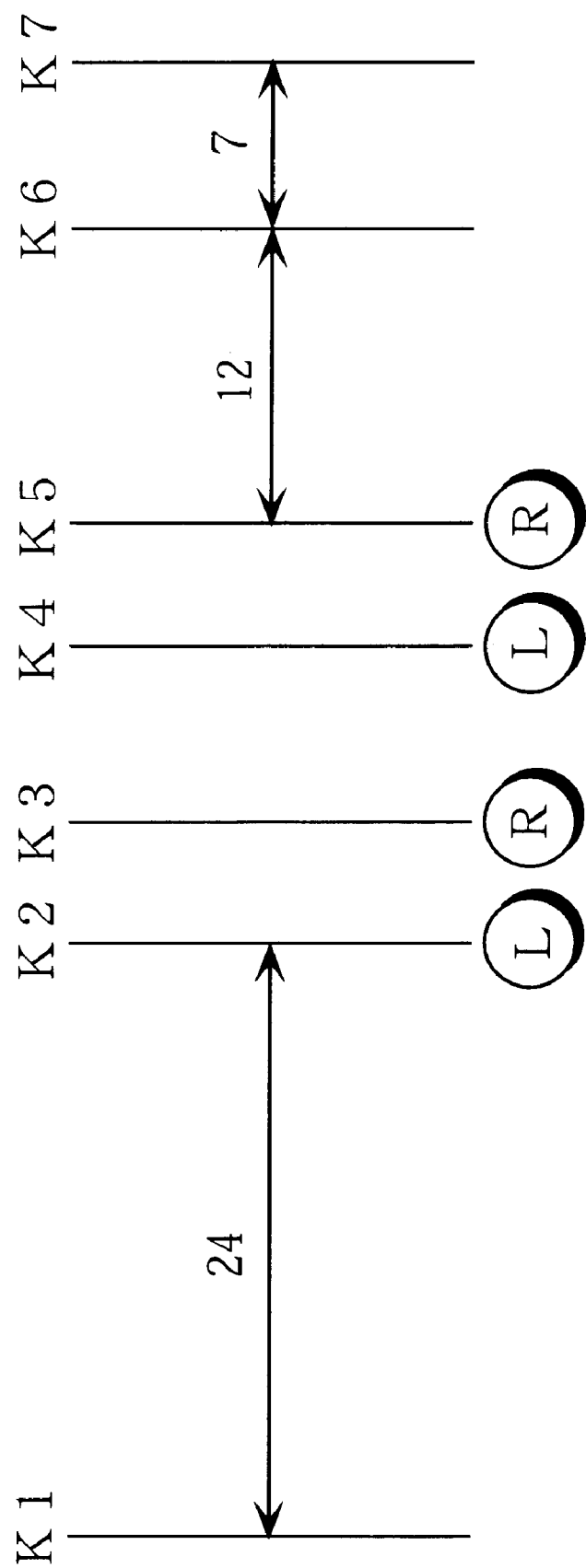
FIG. 30 is a typical diagram showing a correspondence between each of columns in which projected points exist in a portion where the columns are continued at spacing which is not more than a defined value and a left column (L) and a right column (R) of a masu.

When the character width W1 and the character spacing W2 are thus determined, it is determined whether each of the columns K2 to K5 in the region Q for judging a character width and character spacing corresponds to a left column (L) in the masu or a right column (R) in the masu, as shown in FIG. 30.

Figure 31:
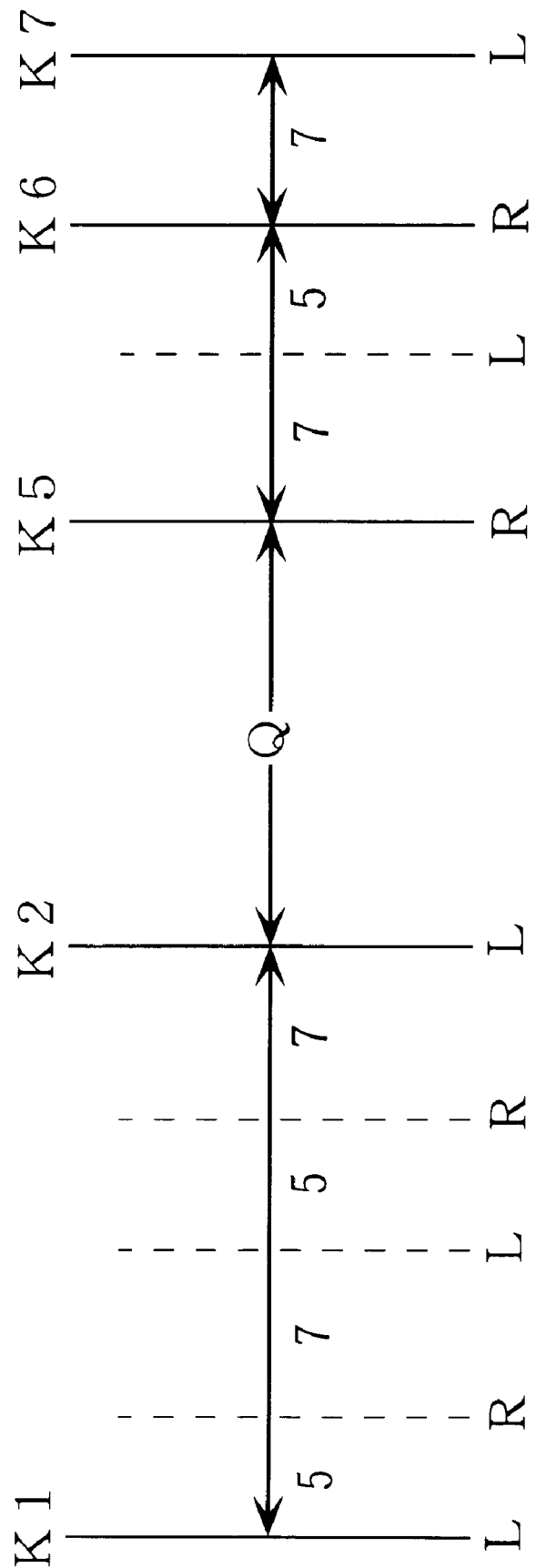
FIG. 31 is a typical diagram showing a left column (L) and a right column (R) which are predicted on the left side and the right side of a portion where columns in which projected points exist are continued at spacing which is not more than a defined value.
Figure 32:
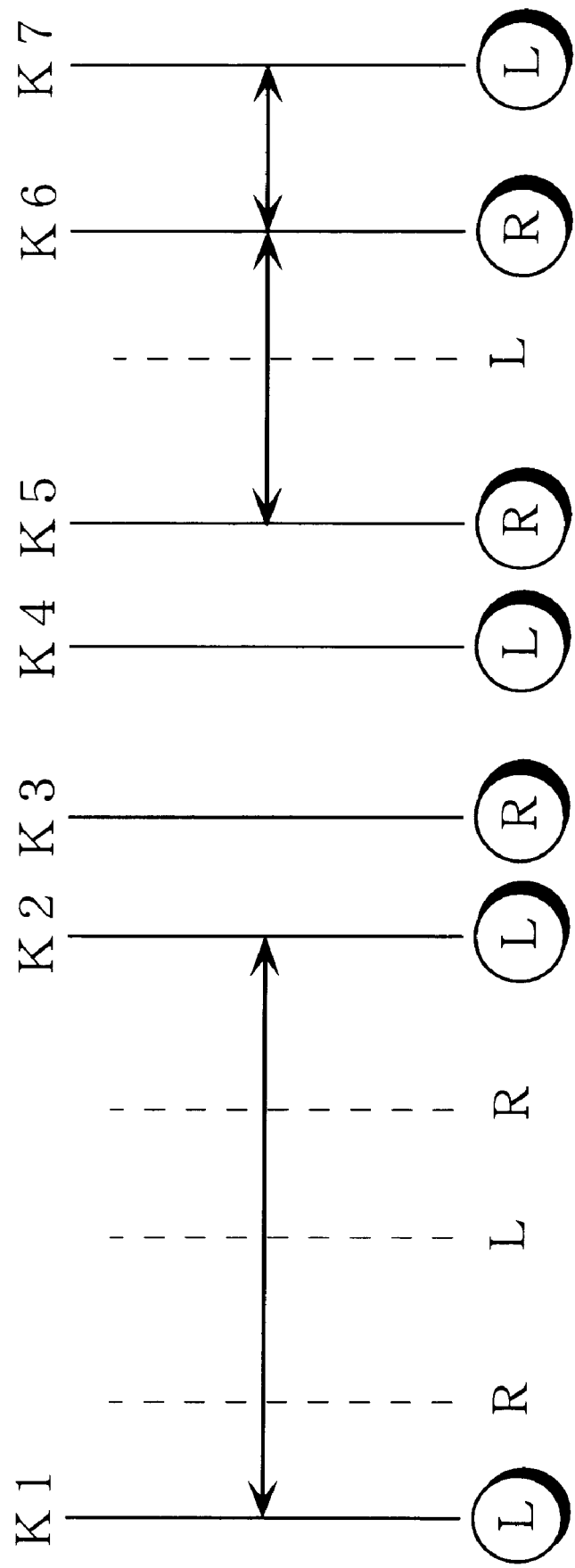
FIG. 32 is a typical diagram showing a correspondence between each of columns in which projected points exist and a left column (L) and a right column (R) of a masu.

As shown in FIG. 31, the positions of the left columns (L) and the right columns (R) are predicted on the basis of the determined character width W1 and character spacing W2 on the left side and the right side of the region Q for judging a character width and character spacing. As shown in FIG. 32, it is determined whether each of the columns K1 to K7 in which projected points exist is the left column (L) or the right column (R) in the row of braille currently paid attention to on the basis of the predicted positions of the left columns (L) and the right columns (R).

When it is determined whether each of the columns K1 to K7 in which projected points exist is the left column (L) or the right column (R) in the row of braille currently paid attention to, data representing a pattern of projected points in each masu and a reference position of the masu are recognized in the row of braille currently paid attention to. A coordinate value of the peak P at the upper left of the masu (see FIG. 33) is used as the reference position of the masu.

Figure 33:
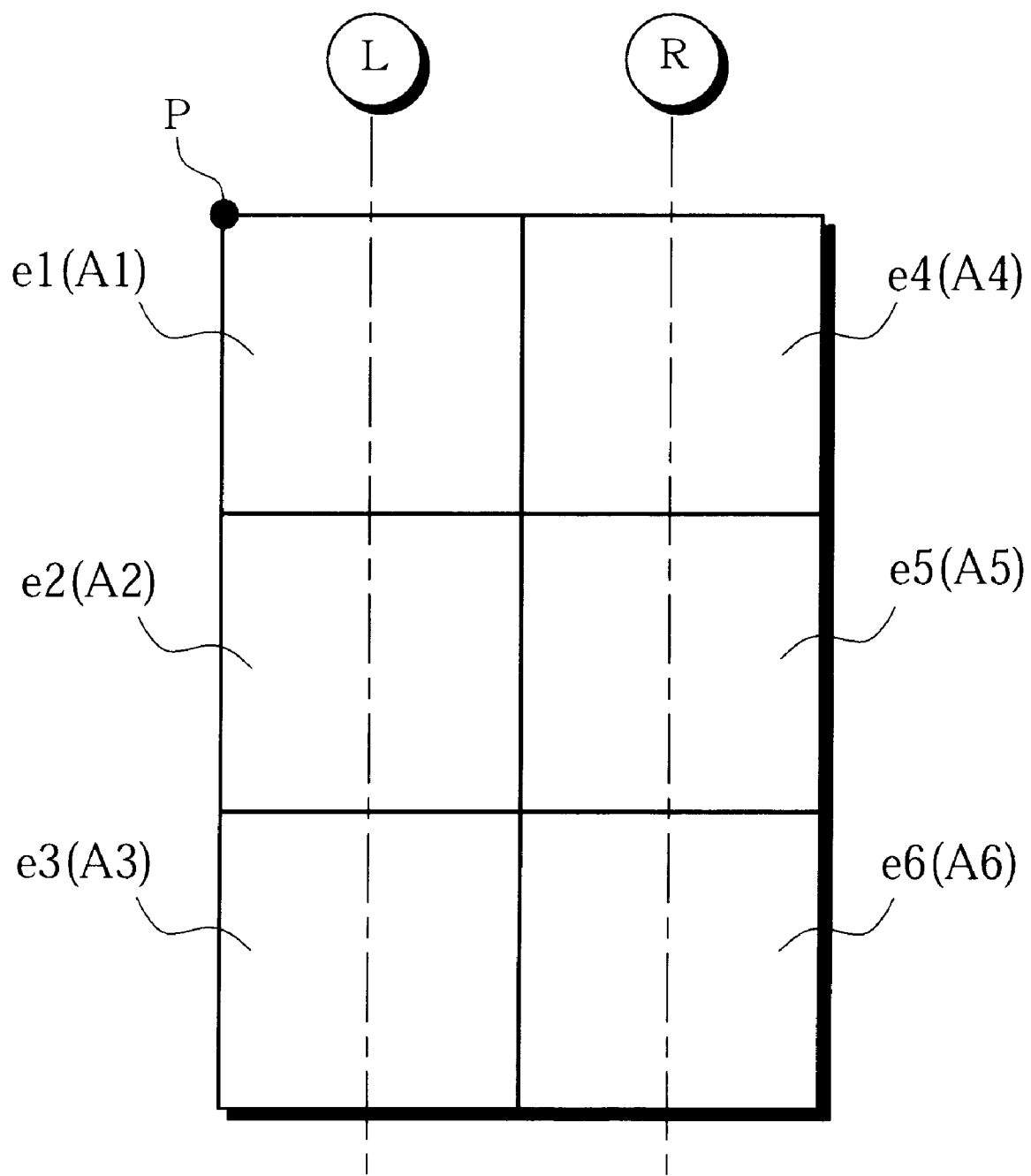
FIG. 33 is a typical diagram for explaining braille pattern data.

The data representing a pattern of projected points in each masu is constituted by data $A_i$ (i=1 to 6) for identifying the presence or absence of projected points which respectively correspond to six regions $e_1$ to $e_6$ where projected points can be formed in one masu, as shown in FIG. 33. The data $A_i$ for identifying the presence or absence of projected points is "1" in a case where there are projected points in the region, while being "0" in a case where there are no projected points in the region.

The data representing a pattern of projected points which is recognized for each masu and the reference position of the masu are stored in the braille information storage memory 45.

[4] Description of Braille/Code Conversion Processing by Braille/Code Conversion Processing Section 46

In the braille/code conversion processing section 46, each of the data $A_1$ to $A_6$ for identifying the presence or absence of projected points for each masu is converted into a braille code C on the basis of the following equation (6).

$$C = \sum_{i=1}^{6} A_i \cdot M_i \tag{6}$$

In the foregoing equation (6), $M_i$ are weighting factors $M_1$ to $M_6$ respectively determined in correspondence to regions $e_1$ to $e_6$, and each of the weighting factors $M_1$ to $M_6$ is set as expressed by the following equation (7):

$$M_1=1,\ M_2=2,\ M_3=4\ M_4=8,\ M_5=16,\ M_6=32 \tag{7}$$

Consequently, each of codes "0" to "63" are assigned to each masu. The assigned code is converted into NABCC, and is then stored in the code storage memory 47.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A braille recognition system comprising:

imaging means for obliquely irradiating light onto the surface of a document in braille and receiving its reflected light, to obtain a first gray image; and projected point extracting means for extracting each of projected points on the surface of said document in braille on the basis of said first gray image, said projected point extracting means comprising differentiating means for subjecting, while scanning the first gray image in a direction corresponding to a direction parallel to the direction of light irradiation, said first gray image to differentiation processing in the scanning direction, to produce a second gray image whose light and dark portions respectively produced by the projected points have a particular pattern, ternary-coding processing means for subjecting said second gray image to such ternary-coding processing that the particular pattern of the light and dark portions respectively produced by the projected points in the second gray image is emphasized, to produce a ternary-coded image, and pattern matching processing means for extracting each of the projected points by pattern matching with respect to said ternary-coded image.

2. The braille recognition system according to claim 1, wherein said differentiating means subjects said first gray image to differentiation processing using a Sobel differential operator.

3. The braille recognition system according to claim 1, further comprising braille code producing means for recognizing the projected points constituting each braille unit on the surface of said document in braille on the basis of the results of the extraction of the projected points by said projected point extracting means and producing a braille code corresponding to the results of the recognition.

4. The braille recognition system according to claim 3, wherein said differentiating means subjects said first gray image to differentiation processing using a Sobel differential operator.

5. A braille recognition system according to claim 1, wherein the document in braille has braille printed on both its surfaces, and said system further comprises;

recessed point extracting means for extracting recessed points on the surface, onto which the light is irradiated, out of both the surfaces of said document in braille on the basis of said first gray image, wherein said differentiating means is a first differentiating means, said ternary-coding processing means is a first ternary code processing means, said pattern matching means is a first pattern matching means, and said recessed point extracting means comprises second differentiating means for subjecting, while scanning the first gray image in a direction corresponding to a direction parallel to the direction of light irradiation, said first gray image to second differentiation processing in the scanning direction, to produce a third gray image whose light and dark portions respectively produced by the recessed points have a particular pattern, second ternary-coding processing means for subjecting said third gray image to such ternary-coding processing that the particular pattern of the light and dark portions respectively produced by the recessed points in the third gray image is emphasized, to produce a second ternary-coded image, and second pattern matching processing means for extracting each of the recessed points by pattern matching with respect to said second ternary-coded image.

6. The braille recognition system according to claim 5, wherein said first differentiating means subjects said first gray image to differentiation processing using a first Sobel differential operator, and said second differentiating means subjects said first gray image to differentiation processing using a second Sobel differential operator having weighting factors which are opposite in sign to those of the first Sobel differential operator.

7. The braille recognition system according to claim 5, further comprising first braille code producing means for recognizing the projected points constituting each braille unit on the surface of said document in braille on the basis of the results of the extraction of the projected points by said projected point extracting means and producing a braille code corresponding to the results of the recognition, and second braille code producing means for recognizing recessed points constituting each braille unit on the reverse surface of said document in braille on the basis of the results of the extraction of the recessed points by said recessed point extracting means and producing a braille code corresponding to the results of the recognition.

8. The braille recognition system according to claim 7, wherein said first differentiating means subjects said first gray image to differentiation processing using a first Sobel differential operator, and said second differentiating means subjects said first gray image to differentiation processing using a second Sobel differential operator having weighting factors which are opposite in sign to those of the first Sobel differential operator.

* * * * *